United States Patent
Ginesi et al.

(10) Patent No.: US 10,749,596 B2
(45) Date of Patent: Aug. 18, 2020

(54) INTERFERENCE-RESILIENT FLEXIBLE TECHNIQUES FOR PAYLOAD RESOURCE ALLOCATION IN BROADBAND SATELLITES

(71) Applicant: European Space Agency, Paris (FR)

(72) Inventors: Alberto Ginesi, Amsterdam (NL); Pantelis-Daniel Arapoglou, Noordwijk (NL); Emiliano Re, Noordwijk (NL)

(73) Assignee: European Space Agency, Paris (FR)

( * ) Notice: Subject to any disclaimer, the term of this patent is extended or adjusted under 35 U.S.C. 154(b) by 0 days.

(21) Appl. No.: 16/308,154

(22) PCT Filed: Jun. 10, 2016

(86) PCT No.: PCT/EP2016/063358
§ 371 (c)(1),
(2) Date: Dec. 7, 2018

(87) PCT Pub. No.: WO2017/211430
PCT Pub. Date: Dec. 14, 2017

(65) Prior Publication Data
US 2019/0305842 A1    Oct. 3, 2019

(51) Int. Cl.
*H04B 7/204* (2006.01)
*H04B 17/345* (2015.01)
(Continued)

(52) U.S. Cl.
CPC ......... *H04B 7/2041* (2013.01); *H04B 1/0475* (2013.01); *H04B 1/1027* (2013.01); *H04B 7/18515* (2013.01); *H04B 17/345* (2015.01)

(58) Field of Classification Search
CPC .......................................... H04B 7/185–2041
See application file for complete search history.

(56) References Cited

U.S. PATENT DOCUMENTS 6,055,431 A     4/2000  Dybdal
10,270,520 B2 * 4/2019  Arapoglou ........... H04B 7/0452
(Continued)

FOREIGN PATENT DOCUMENTS

EP  0 944 183 A1   9/1999
EP  1 973 240 A2   9/2008
EP  2 958 249 A1  12/2015

OTHER PUBLICATIONS

Mukherjee, S. et al., "Multidimensional Resource Management Algorithm for a Multibeam EHF Satellite System", 2014 IEEE Aerospace Conference, IEEE, Mar. 1, 2014, pp. 1-8.
(Continued)

*Primary Examiner* — Raymond S Dean
(74) *Attorney, Agent, or Firm* — Seed Intellectual Property Law Group LLP

(57) ABSTRACT

A method of controlling transmission of signals in a group of beams emitted by a satellite, wherein each beam has an associated area of coverage, includes adjusting an allocation of a channel resource by re-distributing portions of the channel resource among the beams in the group of beams in accordance with respective capacity demands for the areas of coverage of the beams in the group. The method further includes obtaining, for each of the areas of coverage, an indication of a signal quality from a terminal in the respective area of coverage for the adjusted allocation of the channel resource, and applying a co-channel interference mitigating technique to the group of beams in accordance with the obtained indications of the signal quality. The application further relates to an apparatus for performing such method.

16 Claims, 13 Drawing Sheets

(51) Int. Cl.
*H04B 1/04* (2006.01)
*H04B 1/10* (2006.01)
*H04B 7/185* (2006.01)

(56) References Cited

U.S. PATENT DOCUMENTS

2011/0044237 A1   2/2011  Oh et al.
2013/0244572 A1*  9/2013  Angeletti ........... H04B 7/18513
                                                           455/12.1
2017/0201892 A1*  7/2017  Wen .................. H04L 5/006

OTHER PUBLICATIONS

International Search Report for Application No. PCT/EP2016/063358, dated Feb. 23, 2017, 3 pages.
Caus, M. et al., "An innovative interference mitigation approach for high throughput satellite systems", 16$^{th}$ IEEE International Workshop on Signal Processing Advances in Wireless Communications, SPAWC 2015, 5 pages.

* cited by examiner

INTERFERENCE-RESILIENT FLEXIBLE TECHNIQUES FOR PAYLOAD RESOURCE ALLOCATION IN BROADBAND SATELLITES

BACKGROUND

Technical Field

The present disclosure relates to methods and apparatus for controlling transmission of signals in a group of beams emitted by a satellite, such as a broadband satellite, for example. The disclosure particularly relates to such methods and apparatus that allow for reducing the discrepancy between an available capacity for data transmission and a capacity demand for data transmission in the beams of the group of beams.

Description of the Related Art

The ability to flexibly allocate satellite payload resources over the service coverage area is becoming increasingly important for next generation broadband satellites employing a number of spot beams. Indeed, previous and current broadband systems have shown that large multi-beam High Throughput Satellites (HTS) are typically able to fill-up the capacity of some beams fairly quickly, while some other beams remain (almost) empty over a relatively long part of the satellite life time. The consequence in general is an inefficient utilization of the satellite's resources and in particular, may be a loss of the satellite operator's revenue due to the number of customers lost within the hot-spots (corresponding to the filled-up beams) and the waste of resources over the (almost) empty spots.

The performance of a broadband HTS system (as well as the performance per beam) may be characterized by the capacity demand (requested capacity), the offered capacity (available capacity), the usable capacity, the unused capacity, and the unmet capacity demand. The capacity demand is the capacity that is requested by the users in the area of coverage of the broadband HTS system (or the beam in question). The capacity demand is typically geographically non-uniform and time variant. The offered system capacity represents the maximum capacity of the system (or the beam in question), while considering an infinite capacity demand per location. The usable system capacity is the capacity that is really sold taking into account the real capacity demand per location. The unused system capacity is the difference between the offered capacity and the usable capacity. Lastly, the unmet capacity demand is the difference between the capacity demand and the offered capacity.

These definitions are schematically explained in FIG. 1 which illustrates an example of a hypothetical system with three beams. For the first beam (Beam 1), the offered capacity (available capacity) 110 exceeds the usable capacity 112 by an amount 114 of unused capacity. Similarly, for the second beam (Beam 2), the offered capacity (available capacity) 120 exceeds the usable capacity 122 by an amount 124 of unused capacity. For the third beam (Beam 3) on the other hand, the capacity demand 130 exceeds the available capacity 132 by an amount 143 of unmet capacity.

The primary goal of flexibility is to minimize the unused capacity and the unmet capacity. Introduction of flexibility helps a satellite operator to manage the risks accounted by the unpredicted changes, like regulatory context, competing context, socio-economic context. Flexibility refers to the ability to change the configuration of the system during the operational life of the satellite. The remainder of this document will relate to flexibility in the forward link of satellite systems, such as for example HTS systems. The forward link consists of the uplink between a gateway ground station and the satellite, and the downlink between the satellite and the user terminals. Typically, performance of the forward link is the most important aspect in determining the revenues of the satellite operator.

A number of initiatives have been recently undertaken to support flexibility at payload equipment level. The Hylas satellite and the more recent Quantum program, as well the VIASAT-2 satellite are just a few examples. Nevertheless, these initiatives are not able to reduce the gap between the requested and offered capacity below a given level.

Thus, there is a need for improved methods and apparatus for controlling transmission of signals in a group of beams emitted by a satellite. There further is a need for such methods and apparatus that enable to reduce a discrepancy between an available capacity and a capacity demand for the beams of the group of beams, i.e., to reduce the unmet and unused capacity. There further is a need for such methods and apparatus that do not adversely affect signal quality at the user level.

BRIEF SUMMARY AND INITIAL DESCRIPTION

In view of some or all of these needs, the present disclosure proposes a method of controlling transmission of signals in a group of beams (transmission beams) emitted by a satellite and an apparatus for controlling transmission of signals in a group of beams emitted by a satellite, having the features of the respective independent claims.

An aspect of the disclosure relates to a method of controlling transmission of signals in a group of beams (beam cluster) emitted by a satellite. The beams may be spot beams. Each beam may have an associated area of coverage. The method may include adjusting an allocation of a channel resource (payload resource) by re-distributing portions of the channel resource among the beams in the group of beams in accordance with respective capacity demands for the areas of coverage of the beams in the group. The capacity demands may be capacity demands for data transmission, i.e., combined traffic request for user terminals in the respective area of coverage. Further, the capacity demands may change over time (i.e., may be time variant) and may be different from actual/projected capacity demands at the time of deployment of the satellite. The capacity demands may be geographically non-uniform. Adjusting the channel resource may be performed dynamically and in particular may be performed after deployment of the satellite.

The method may further include obtaining (e.g., receiving or computing), for each of the areas of coverage, an indication of a signal quality from a terminal in the respective area of coverage for the adjusted allocation of the channel resource. The indications of signal quality may be indicative of a degree of interference (cross talk) between signals from beams of adjacent areas of coverage, e.g., may be channel state information.

The method may yet further include applying a co-channel interference mitigating technique to the group of beams in accordance with the obtained (e.g., received or computed) indications of the signal quality. Applying the co-channel interference mitigating technique may be performed at a gateway (hub) that transmits signals to the satellite.

In general, the co-channel interference mitigating technique may be a technique for mitigating co-channel interference among the signals transmitted in the beams. The co-channel interference mitigation technique may be a centralized technique, such as for example precoding, or a decentralized technique, such as for example Multi User Detection (MUD). Accordingly, applying the co-channel interference mitigating technique may involve performing precoding across the group of beams in accordance with the obtained (e.g., received) indications of the signal quality, or performing a MUD technique in accordance with estimations of the signal quality for example obtained (e.g., computed) at the terminals. Precoding may relate to or involve applying signal processing at the transmitter side (e.g., at the gateway) in order to mitigate generation of interference across the beams. For example, precoding may involve applying a respective linear combination of signals to be transmitted to each of the beams (e.g., to corresponding beam feeds). Thus, signals to be transmitted may be weighted by a set of coefficients (weight coefficients) that form a precoding matrix.

Configured as such, the proposed method provides a broadband satellite resource allocation algorithm which allows to flexibly allocate a forward link capacity which closely matches the requested beam capacity to the different beams within the coverage. This is achieved without deteriorating signal quality at the user terminal side. In particular, adjusting the allocation of the channel resource (payload resource) to the beams in the beam cluster served by the gateway allows to closely match the offered capacity in each beam to the capacity demand in the respective beam. On the other hand, co-channel interference mitigation that is applied to the beams in the beam cluster removes (or significantly reduces) intra-system co-channel interference between the beams in the beam cluster. Thus, the proposed method achieves the aforementioned effects by advantageously combining flexible and dynamic allocation of the channel resource and co-channel interference mitigation. Known solutions show a significantly higher gap between the requested and offered capacity.

In embodiments, adjusting the allocation of the channel resource may be performed such that after re-distributing the portions of the channel resource, at least one portion of the channel resource is allocated to more than one beam in the group of beams.

By virtue of co-channel interference mitigation, such as precoding, for example, portions of the channel resource may be allocated to multiple beams (e.g., beams in the beam cluster may be illuminated simultaneously or may transmit in the same frequency sub-band). Thereby, the satellite's resources can be utilized more efficiently, and a mismatch between the offered capacity (available capacity) for data transmission in each beam and the capacity demand can be significantly reduced. Correspondingly, the unused or unmet capacity for each beam can be significantly reduced.

In embodiments, the channel resource may be sub-divided into a plurality of units of identical size.

In embodiments, the channel resource may be a time frame that includes a plurality of time slots and periodically repeats in time. Put differently, the channel resource may be a time resource and the identical units may be time slots. Adjusting the allocation of the channel resource may involve allocating a respective number of time slots per time frame to each of the beams in the group of beams. In this case, adjusting the allocation of the channel resource may be said to correspond to beam hopping, i.e., to a flexible time allocation scheme.

In embodiments, the channel resource may be a frequency band that includes a plurality of frequency sub-bands. Put differently, the channel resource may be a frequency resource and the identical units may be frequency sub-bands. Adjusting the allocation of the channel resource may involve allocating a respective number of frequency sub-bands of the frequency band to each of the beams in the group of beams. In this case, adjusting the allocation of the channel resource may be said to correspond to (irregular) frequency re-use, i.e., to a flexible bandwidth allocation scheme.

In embodiments, both the allocation of time resource and the frequency resource to the beams in the group of beams may be adjusted.

In embodiments, co-channel interference mitigation (e.g., precoding or MUD) may be performed across pairs or triplets of beams in the group of beams. A triplet of beams is understood to represent a group of three beams. Thereby, the computational load required for performing co-channel interference mitigation (e.g., precoding or MUD) can be reduced, taking advantage of the fact that the beams outside the beam cluster cause much less interference (thanks to a farther geographical distance or due to the use of orthogonal polarization).

In embodiments, the method may further include applying the co-channel interference mitigation technique (e.g., performing precoding or MUD) across the group of beams in accordance with a pre-stored co-channel interference mitigation scheme (e.g., a precoding scheme or MUD scheme) until the indications of the signal quality have been obtained (e.g., received or computed). Thereby, the proposed method can mitigate the impact of intra-system co-channel interference almost instantaneously after the adjustment of the allocation of the channel resource.

In embodiments, the method may further include determining whether a capacity demand for at least one of the areas of coverage has changed. This determination may be performed periodically, e.g., once every few hours. The change of capacity demand may be defined with respect to a set of capacity demands for which the previous adjustment had been performed. The method may yet further include, if it is determined that the capacity demand for the at least one of the areas of coverage has changed, adjusting the allocation of the channel resource. This enables to flexibly react to changing capacity demands in one or more beams in the beam cluster, thereby reducing a time average of unmet capacity and unused capacity. By virtue of co-channel interference mitigation, this flexible reaction to changed capacity demand situations does not result in a deterioration of signal quality at the user level.

In embodiments, the channel resource may be sub-divided into the plurality of units of identical size. The method may further include, for each beam in the group of beams, determining, as a first number, a number of units of the channel resource for allocation to the respective beam on the basis of the capacity demand for the area of coverage of the respective beam. The number of units may be proportional to the respective capacity demand. As indicated above, at least one unit may be allocated to more than one beam. The method may further include, for each beam in the group of beams, allocating the respective first number of units of the channel resource to the respective beam.

In embodiments, the satellite may include one or more further groups of beams. The one or more further groups of beams may be served by gateways that are different from the gateway serving the group of beams. The method may further include, for each beam in the group of beams, determining, as a second number, a number of beams in the one or more further groups of beams that have their respective areas of coverage adjacent to the area of coverage of the respective beam. The adjusting of the allocation of the channel resource may be performed in a beam-wise manner in the order of the associated second numbers of the beams, starting with the beam having the highest second number. Each beam may be fully allocated in accordance with its first number before proceeding to the next beam. The adjusting of the allocation of the channel resource may involve, for each of the beams in the group of beams, first allocating those units of the channel resource to the respective beam that are not already allocated to any one of the beams in the one or more further groups of beams that have their respective areas of coverage adjacent to the area of coverage of the respective beam. The adjusting of the allocation of the channel resource may further involve, if there is no such unit of the channel resource, allocating a unit of the channel resource to the respective beam that is already allocated to any one of the beams in the one or more further groups of beams that have their respective areas of coverage adjacent to the area of coverage of the respective beam.

Configured as such, the proposed method can minimize co-channel interference between beams for which the co-channel interference mitigation technique (e.g., precoding or MUD) cannot be applied, in particular to beams in different beam clusters served by different gateways that may not be aware of each other.

In embodiments, the method may further include, for each beam in the group of beams, determining a difference between the capacity demand and the available capacity provided by the respective beam. The method may further include determining a change in transmission power for the respective beam in order to reduce said difference. The change (change amount) in transmission power may correspond to an increment or decrement in transmission power. For example, the change in transmission power may be determined following the Shannon bound, e.g., according to the Shannon bound. Therein, the overall power (sum power) of transmission powers of all beams in the group of beams (or at least of respective sub-groups of beams in the group of beams) may be kept constant. This may involve normalizing the determined changes in transmission power on the basis of a total change in transmission power calculated from the determined individual changes in transmission power. The method may yet further include adjusting the transmission power of the respective beam on the basis of the determined change in transmission power.

By virtue of the co-channel interference mitigation technique that is applied by the proposed method, an increase/decrease in transmission power for a given beam may translate into an actual improvement/decrease in throughput. Thereby, any remaining discrepancy between the offered capacity (available capacity) and the capacity demand that persists after adjusting the allocation of the channel resource can be further reduced.

In embodiments, the satellite may comprise one or more further groups of beams. The one or more further groups of beams may be served by gateways that are different from the gateway serving the group of beams. The method may further include adjusting a polarization pattern for those beams in the group of beams or the one or more further groups of beams, whose area of coverage is adjacent to an area of coverage belonging to a beam in a different one of the group of beams or the one or more further groups of beams. The adjusting of the polarization pattern may be performed such that distances between areas of coverage of beams with the same polarization in different ones of the group of beams and the one or more further groups of beams are maximized. Maximizing the distances may involve maximizing a mean distance or any other (cost) function of distances. Thereby, co-channel interference between beams in different beam clusters that are served by different gateways can be further reduced, even though the co-channel interference mitigation technique may not be applied to those beams.

Another aspect of the disclosure relates to an apparatus for controlling transmission of signals in a group of beams (beam cluster) emitted by a satellite. The beams may be spot beams. Each beam may have an associated area of coverage. The apparatus may include a controller adapted to adjust an allocation of a channel resource (payload resource) by re-distributing portions of the channel resource among the beams in the group of beams in accordance with respective capacity demands for the areas of coverage of the beams in the group. The capacity demands may be capacity demands for data transmission, i.e., traffic request, or combined traffic request for user terminals in the respective area of coverage. Further, the capacity demands may change over time (i.e., may be time variant) and may be different from actual/projected capacity demands at the time of deployment of the satellite. The capacity demands may be geographically non-uniform. Adjusting the channel resource may be performed dynamically and in particular may be performed after deployment of the satellite.

The apparatus may further include a receiver adapted to receive, for each of the areas of coverage, an indication of a signal quality from a terminal in the respective area of coverage for the adjusted allocation of the channel resource. The indications of signal quality may be indicative of a degree of interference (cross talk) between signals from beams of adjacent areas of coverage, e.g., may be channel state information.

The controller may be further adapted to apply a co-channel interference mitigating technique to the group of beams in accordance with the indications of the signal quality received by the receiver. Applying the co-channel interference mitigating technique may be performed at a gateway (hub) that transmits signals to the satellite. In general, the co-channel interference mitigating technique may be a technique for mitigating co-channel interference among the signals transmitted in the beams. The co-channel interference mitigation technique may be a centralized technique, such as for example precoding, or a decentralized technique, such as for example Multi User Detection (MUD). Accordingly, the controller may be further adapted to perform precoding across the group of beams in accordance with the received indications of the signal quality, or to initiate performing a MUD technique in accordance with the received indications of the signal quality. Precoding may relate to or involve applying signal processing at the transmitter side (e.g., at the gateway) in order to mitigate generation of interference across the beams. For example, precoding may involve applying a respective linear combination of signals to be transmitted to each of the beams (e.g., to corresponding beam feeds). Thus, signals to be transmitted may be weighted by a set of coefficients (weight coefficients) that form a precoding matrix.

In embodiments, the controller may be adapted to adjust the allocation of the channel resource in such a manner that after re-distributing the portions of the channel resource, at least one portion of the channel resource is allocated to more than one beam in the group of beams. That is, the controller may be adapted to allocate at least one portion of the channel resource to more than one beam in the group of beams.

In embodiments, the channel resource may be sub-divided into a plurality of units of identical size.

In embodiments, the channel resource may be a time frame that includes a plurality of time slots and periodically repeats in time. Put differently, the channel resource may be a time resource and the identical units may be time slots. Adjusting the allocation of the channel resource may involve allocating a respective number of time slots per time frame to each of the beams in the group of beams. In this case, adjusting the allocation of the channel resource may be said to correspond to beam hopping, i.e., to a flexible time allocation scheme.

In embodiments, the channel resource may be a frequency band that includes a plurality of frequency sub-bands. Put differently, the channel resource may be a frequency resource and the identical units may be frequency sub-bands. Adjusting the allocation of the channel resource may involve allocating a respective number of frequency sub-bands of the frequency band to each of the beams in the group of beams. In this case, adjusting the allocation of the channel resource may be said to correspond to (irregular) frequency re-use, i.e., to a flexible bandwidth allocation scheme.

In embodiments, both the allocation of time resource and the frequency resource to the beams in the group of beams may be adjusted.

In embodiments, the controller may be adapted to perform co-channel interference mitigation (e.g., precoding or MUD) across pairs or triplets of beams in the group of beams. A triplet of beams is understood to represent a group of three beams. In embodiments, the controller may be adapted to apply the co-channel interference mitigation technique (e.g., perform precoding or MUD) across the group of beams in accordance with a pre-stored co-channel interference mitigation scheme (e.g., a precoding scheme or MUD scheme) until the indications of the signal quality have been obtained (e.g., received or computed).

In embodiments, the controller may be further adapted to determine whether a capacity demand for at least one of the areas of coverage has changed. The controller may be adapted to perform this determination periodically, e.g., once every few hours. The change of capacity demand may be defined with respect to a set of capacity demands for which the previous adjustment had been performed. The controller may be further adapted to, if it is determined that the capacity demand for the at least one of the areas of coverage has changed, adjust the allocation of the channel resource.

In embodiments, the channel resource may be sub-divided into the plurality of units of identical size. The controller may be further adapted to, for each beam in the group of beams, determine, as a first number, a number of units of the channel resource for allocation to the respective beam on the basis of the capacity demand for the area of coverage of the respective beam. The number of units may be proportional to the respective capacity demand. As indicated above, at least one unit may be allocated to more than one beam. The controller may be further adapted to, for each beam in the group of beams, allocate the respective first number of units of the channel resource to the respective beam.

In embodiments, the satellite may comprise one or more further groups of beams. The controller may be further adapted to, for each beam in the group of beams, determine, as a second number, a number of beams in the one or more further groups of beams that have their respective areas of coverage adjacent to the area of coverage of the respective beam. The controller may be further adapted to adjust the allocation of the channel resource in a beam-wise manner in the order of the associated second numbers of the beams, starting with the beam having the highest second number. The controller may be adapted to fully allocate each beam in accordance with its first number before proceeding to the next beam. The controller may be yet further adapted to, for each of the beams in the group of beams, first allocate those units of the channel resource to the respective beam that are not already allocated to any one of the beams in the one or more further groups of beams that have their respective areas of coverage adjacent to the area of coverage of the respective beam. The controller may be adapted to allocate, if there is no such unit of the channel resource, a unit of the channel resource to the respective beam that is already allocated to any one of the beams in the one or more further groups of beams that have their respective areas of coverage adjacent to the area of coverage of the respective beam.

In embodiments, the controller may be further adapted to, for each beam in the group of beams, determine a difference between the capacity demand and the available capacity provided by the respective beam. The controller may be further adapted to determine a change in transmission power for the respective beam in order to reduce said difference. The change (change amount) in transmission power may correspond to an increment or decrement in transmission power. For example, the controller may be adapted to determine the change in transmission power so as to meet the Shannon bound. Therein, the overall power (sum power) of transmission powers of all beams in the group of beams (or at least of respective sub-groups of beams in the group of beams) may be kept constant. To this end, the controller may be adapted to normalize the determined changes in transmission power on the basis of a total change in transmission power calculated from the determined individual changes in transmission power. The controller may be yet further adapted to adjust the transmission power of the respective beam on the basis of the determined change in transmission power.

Notably, the apparatus may be used to carry out any of the methods described above, and the methods may be applied to any of the apparatus described above, for example as methods of operating these apparatus.

Moreover, it will be appreciated that method steps and apparatus features may be interchanged in many ways. In particular, the details of the disclosed method can be implemented as an apparatus adapted to execute some or all the steps of the method, and vice versa, as the skilled person will appreciate. In particular, it is understood that methods according to the disclosure relate to methods of operating the apparatus according to the above embodiments and variations thereof, and that respective statements made with regard to the apparatus likewise apply to the corresponding methods, and vice versa.

BRIEF DESCRIPTION OF THE SEVERAL VIEWS OF THE DRAWINGS

Embodiments of the disclosure are explained below in an exemplary manner with reference to the accompanying drawings, wherein FIG. 1 schematically illustrates an example of available capacities and capacity demands for a number of transmission beams emitted by a satellite, FIG. 2 schematically illustrates an example for allocating a frequency resource to a number of transmission beams emitted by a satellite.

DETAILED DESCRIPTION

Figure 1:
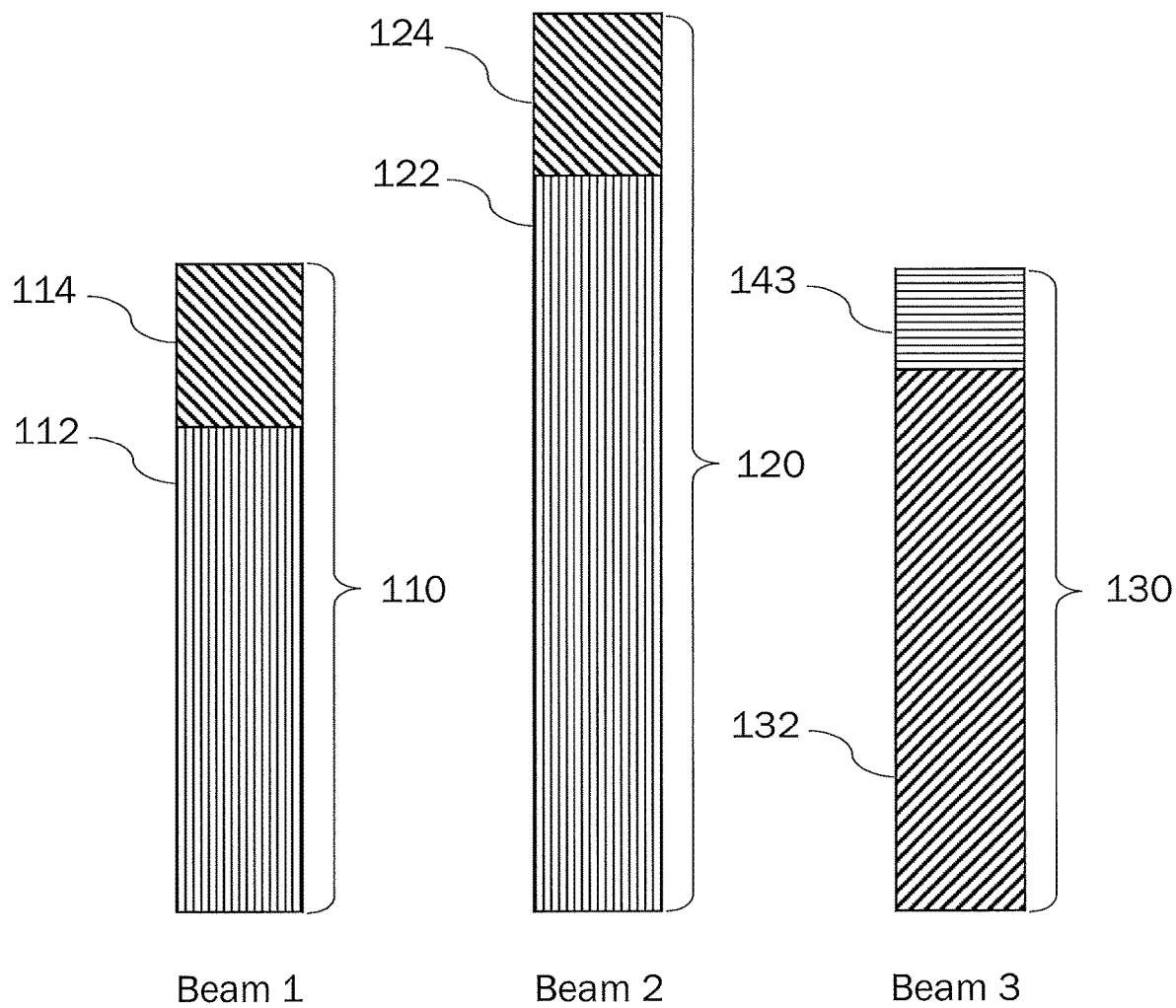

In the following, exemplary embodiments of the disclosure will be described with reference to the appended figures. Identical elements in the figures may be indicated by identical reference numbers, and repeated description thereof may be omitted.

Broadly speaking, the present disclosure relates to a satellite (e.g., broadband satellite) resource allocation algorithm that allows to flexibly allocate a forward link capacity to the different beams within the coverage which closely matches the requested beam capacity (capacity demand). This resource allocation algorithm can be used for satellites (e.g., broadband satellites) to better follow the coverage capacity demand distribution over time.

A number of techniques are available to support flexibility. Assuming no flexibility on coverage (i.e., assuming fixed areas of coverage per beam), the following techniques may be applied: flexible power allocation, flexible bandwidth allocation, and flexible time allocation (beam hopping). These techniques will be described in the following.

The flexible bandwidth allocation technique and the flexible time allocation technique that will be described below relate to flexible allocation of a channel resource (payload resource). This channel resource may be sub-divided into a plurality of units, e.g., units of identical size. The channel resource may be a time resource (e.g., a time frame), or a frequency resource (e.g., a frequency band). Therein, cases of the channel resource being the time resource or the frequency resource may be said to be dual to each other. The time frame may include a plurality of time slots and periodically repeat in time. The time slots may correspond to the aforementioned units. Correspondingly, the frequency band may include a plurality of frequency sub-bands. Also the frequency sub-bands may correspond to the aforementioned units. Flexible allocation of the channel resource for the case of the channel resource being the time resource corresponds to flexible time allocation (beam hopping), whereas flexible allocation of the channel resource for the case of the channel resource being the frequency resource corresponds to flexible frequency allocation (irregular frequency re-use).

Flexible Power Allocation

To better match the capacity demand in each beam, one possible approach is to distribute the total amount of payload power unevenly across the different beams. Lower power would be assigned to beams with lower capacity demand, while higher power would be given to beams corresponding to hot spots. This technique can be implemented by means of FlexTWTA technology where the saturated power of a Travelling Wave Tube Amplifier (TWTA) is adjusted according to the capacity demand of beams served by the amplified carriers. In case of one High Power Amplifier (HPA) serving two beams (which is a typical configuration), this technique can be applied if the two beams have similar capacity demand. Alternatively, if the two beams have different capacity demand, the power transfer from one beam to the other may be done by suppressing part or all the carriers serving the low demanding beam. Another possible approach for realizing flexible power allocation, instead of FlexTWTA, uses Multi-Port Amplifiers (MPAs).

The drawbacks of flexible power allocation are that any power variation has intrinsically a limited impact to the offered beam capacity due to both the inherent diminishing return behavior of the Shannon function (spectral efficiency versus power) as well as the presence of residual intra-system co-channel interference. Other drawbacks relate to the relatively high cost of the FlexTWTA and MPA components.

Flexible Bandwidth Allocation (Irregular Frequency Re-Use)

This technique involves tuning the amount of band (frequency band) that is allocated to a given beam according to the relative capacity demand. Basically, part of the amount of bandwidth that is allocated to low demanding beams gets transferred to high demanding beams. This can be achieved, for example, by splitting unevenly the user bandwidth allocated to the two beams served by the same TWTA (which is a typical configuration for a four color scheme network) and flexibly routing the two portions of the bandwidths to different antenna feeds. Here, the total allocatable bandwidth (frequency band) serves as an example of the channel resource, as indicated above. Portions or units of the channel resource (e.g., frequency sub-bands) may be transferred between low-demanding beams and high-demanding beams.

Figure 2:
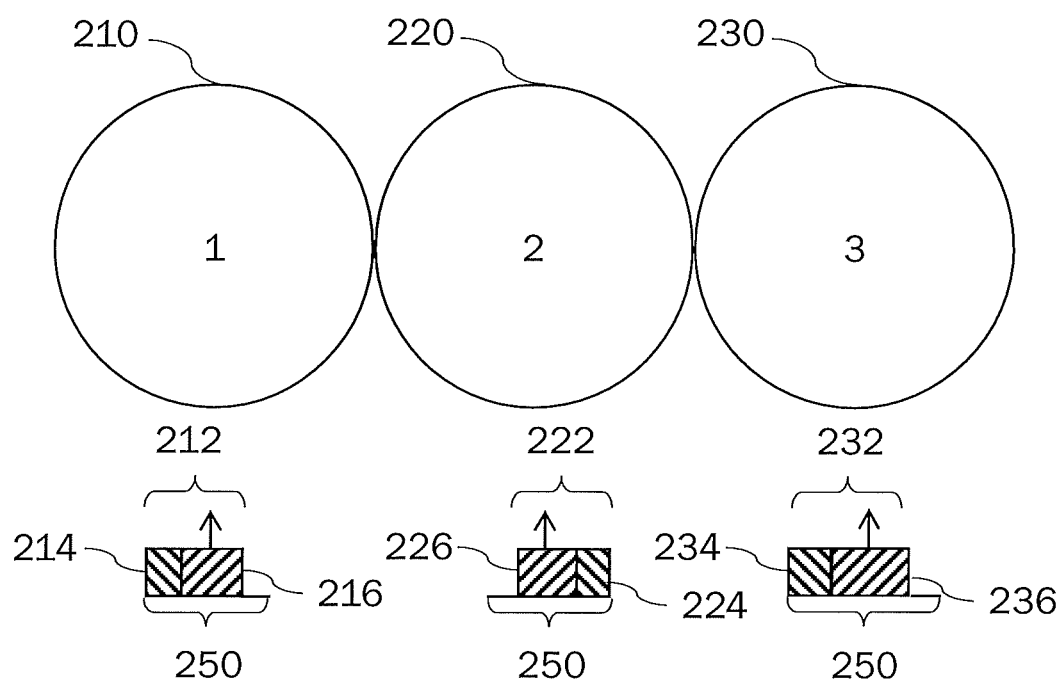

The drawback of such an approach is that in general additional intra-system co-channel interference will be generated due to the possible overlap of the bands assigned to two adjacent co-polar beams. This is graphically illustrated in FIG. 2. In the example of FIG. 2, three hot-spot co-polar beams 210, 220, 230 are located geographically close to each other (i.e., their areas of coverage are located geographically close to each other). Although some counter-measures can be conceived in order to partially limit the impact of the high co-channel interference in part of the user bandwidth (for example, by a cautious assignment of users to the highly interfered portion of the band), the result of this extra interference limits the efficiency of such technique particularly when considering certain traffic demand distributions.

In the example of FIG. 2, a total bandwidth 250 is available for transmission. A first portion 212 of the total bandwidth 250 is allocated to the first beam 210, a second portion 222 of the total bandwidth 250 is allocated to the second beam 220, and a third portion 232 of the total bandwidth 250 is allocated to the third beam 230. Notably, the first to third portions 212, 222, 232 overlap with each other, i.e., include one or more (mutually) common frequency ranges. The first beam 212 suffers from co-channel interference from either or both of the other beams in a first interference portion 216, the second beam 220 suffers from co-channel interference from either or both of the other beams in a second interference portion 226, and the third beam 230 suffers from co-channel interference from either or both of the other beams in a third interference portion 236, which is disjoint in the present example. On the other hand, in first to third interference-free portions 214, 224, 234, the first to third beams 210, 220, 230, respectively, do not suffer from co-channel interference.

Flexible Time Allocation (Beam Hopping)

This technique is exactly dual with respect to the flexible bandwidth allocation technique, i.e., it can be explained by replacing time with frequency. Indeed, this solution can be implemented through the so-called Beam Hopping scheme by which different co-channel beams (e.g., different co-channel beams served by the same HPA) get allocated parts (e.g., formed by one or more time slots of fixed duration) of a periodically repeating time frame. Here, the time frame serves as an example of the channel resource, as indicated above, and the time slots serve as an example of portions (or units) of the channel resource. By modulating the duration of the allocated parts of the time frame (i.e., by modulating the number of time slots or units that form respective parts), different offered capacity values can be reached in different beams. For an uneven capacity demand distribution, adjacent beams might end up being served by different HPAs with overlapping parts of the time frame (i.e., parts having common time slots), thus generating excessive intra-system interference.

In view of the above drawbacks, the present disclosure proposes a solution which greatly improves the efficiency of the flexible bandwidth and flexible time allocation techniques by mitigating the co-channel interference that such allocation techniques might end up generating for certain traffic demand distributions. If indeed the extra generated interference could be cancelled, then the two mentioned allocation techniques would be able to more efficiently match any capacity demand distribution over the coverage area, since the additional band or time allocation would essentially be interference free. The aforementioned allocation techniques' benefits to the overall offered capacity would not only be higher in such situation, but would also be much more predictable.

In practice, the proposed solution can be implemented by a novel combination of the aforementioned allocation techniques with a co-channel interference mitigation technique. This co-channel interference mitigation technique may be a centralized technique, such as for example precoding, or a decentralized technique, such as for example Multi User Detection (MUD). Accordingly, the co-channel interference mitigation technique may include, or correspond to, precoding, or may include, or correspond to, MUD. The co-channel interference mitigation technique (e.g., precoding or MUD) may be performed at the gateway (hub) or at the user terminal (in case of MUD). In the following, an overview over the precoding technique will be given.

Precoding

A description of precoding is given in European patent application EP 14172961, Joint transmitter signal processing in multi-beam satellite systems, published as EP 2 958 249 A1. Reference is particularly made to paragraphs [0042] to [0047] of the published application, which describe linear precoding and which are herewith incorporated by reference in their entirety, as well as to paragraphs [0048] to [0089] of the published application, which describe multicast precoding and which are herewith incorporated by reference in their entirety.

Broadly speaking, precoding is used to pre-cancel co-channel intra-system interference by applying, at the gateway (in general, at the level of signals that are fed to the satellite for transmission), a linear combination of the transmitted signals over the different beams. In practice, the transmitted signals are weighted by coefficients (weight coefficients) from a so-called precoding matrix that perform, at a given of accuracy, an inversion of the channel matrix. The coefficients of the linear combinations are computed based on feedbacks (e.g., channel estimates) provided by the user terminals.

Put differently, precoding may be applied when wirelessly transmitting data in each of a plurality of beams through a plurality of transmit feeds. Channel state information (channel estimates) of user terminals in each of the beams is received, and a set of weight coefficients that relate the plurality of transmit feeds to a plurality of signals that are intended for transmission in the plurality of beams are determined (calculated) on the basis of the channel state information. The plurality of signals are then transmitted through the plurality of transmit feeds in accordance with respective weight coefficients among the set of weight coefficients. That is, for each signal among the plurality of signals and each transmit feed among the plurality of transmit feed, the respective signal is transmitted through the respective transmit feed weighted with a weight coefficient that relates the respective signal to the respective transmit feed. In other words, the determined set of weight coefficients (i.e., a precoding matrix) is applied to the plurality of signals.

According to embodiments of the disclosure, following a re-configuration of channel resource assignment to the beams—that is, a reconfiguration of the bandwidth assignment (in the case of the flexible bandwidth allocation scheme) or of the time slot assignment (in the case of the flexible time allocation scheme)—the user terminals will perform a new channel estimation procedure (training phase). This is necessary as the precoding matrix may be formed for each specific set of served user terminals.

After a relatively short amount of time (typically a few ms), the user terminals would be able to report the new estimates to the gateway (via the satellite) which in turn would apply precoding in order to reduce the interference in situations like the one described in FIG. 2. Therefore, only for a very short time after reconfiguration of the payload resources (i.e., channel resource), the system will undergo a training phase, after which the performance will be only minimally impacted by intra-system interference. This means that, during the training phase, the modulation and coding scheme assigned to user terminals still subject to such interference will have to be very conservative in terms of spectral efficiency (spectral efficiency with SNIR thresholds below 0 dB would need to be selected), but then rapidly adapting to higher spectral efficiencies, once co-channel interference mitigation (e.g., precoding or MUD) is in place. Since the rate of system reconfigurations is very slow (typically the satellite operator may want to change the resource allocation once every few hours, for example), the relative impact of the degraded performance is quite small.

Figure 3:
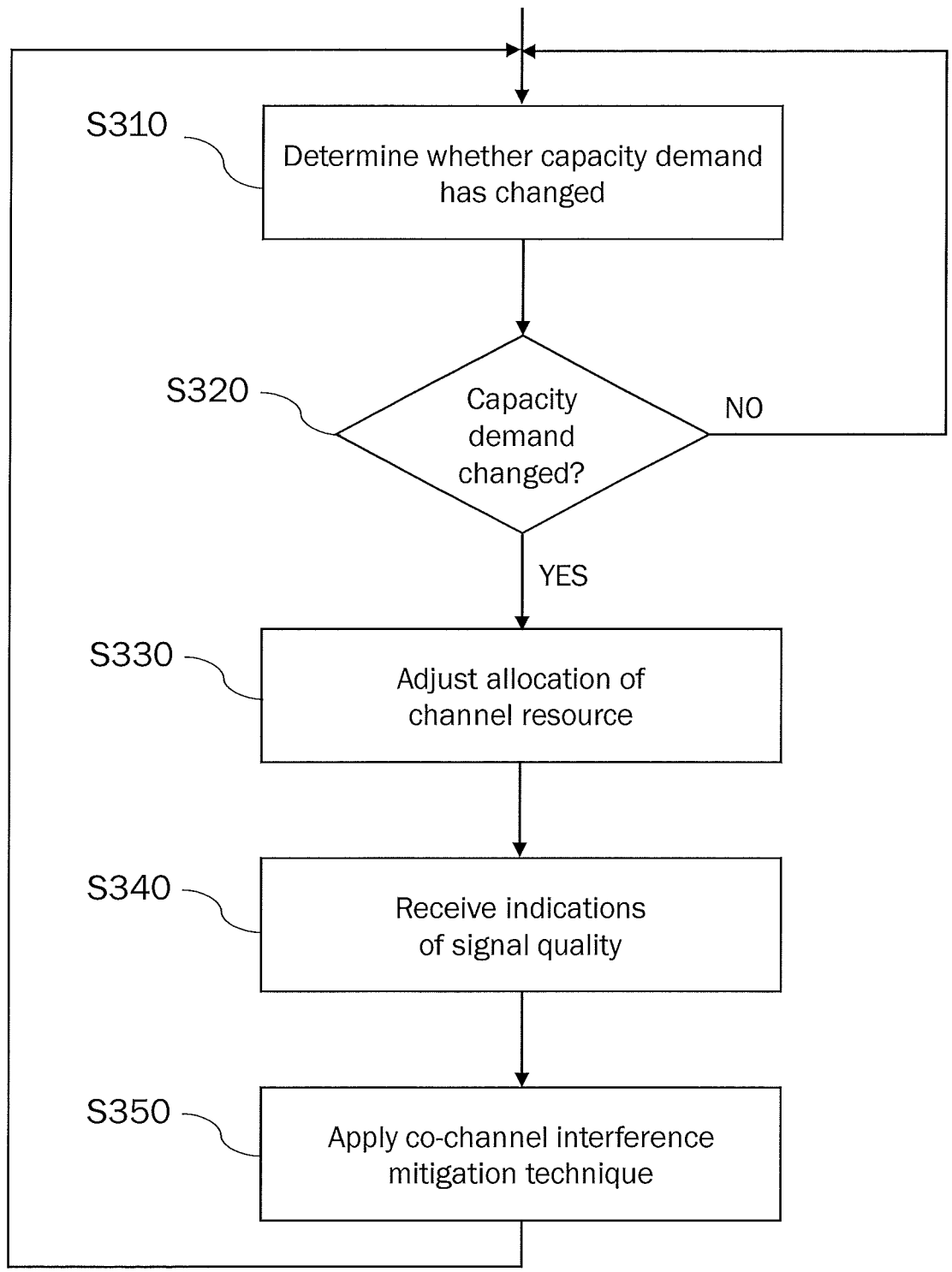
FIG. 3 is a flowchart schematically illustrating an example of a method of controlling transmission of signals in a group of transmission beams emitted by a satellite according to embodiments of the disclosure, FIG. 4 schematically illustrates an example of precoding according to embodiments of the disclosure.

An example of a method of controlling transmission of signals in a group of transmission beams emitted by a satellite according to embodiments of the disclosure is schematically illustrated in the flowchart of FIG. 3.

In general, the method is applicable to transmission of signals in a group of beams served by the same gateway (beam cluster) emitted by the satellite. The beams may be spot beams. Each beam may have an associated area of coverage in which user terminals request capacity for data transmission (i.e., issue traffic requests). For each beam in the beam cluster, a capacity demand is given by the total of the capacities requested by the user terminals in the respective area of coverage. The capacity demands may differ from one beam to another (i.e., may be geographically non-uniform) and may be time variant. Notably, steps S310 to S350 of the method may be performed during active service of the satellite, i.e., after deployment of the satellite. These steps may be performed at a ground station (e.g., gateway, hub) that controls transmission of signals by the satellite in the beam cluster. The gateway may be said to serve the beams in the beam cluster. The satellite may comprise further beam clusters for which signal transmission proceeds under control of different gateways, i.e., that are served by different gateways.

At step S310, it is determined whether a capacity demand has changed for at least one beam in the beam cluster (i.e., for at least one area of coverage). This may involve assessing the current capacity demand for each beam in the beam cluster, and comparing each capacity demand to its previous value (e.g., a value after a previous adjustment of the channel resource). It may be judged that a capacity demand for a given beam has changed if the difference (or ratio) between the assessed value and its previous value exceeds a predetermined threshold.

At step S320, a result of the determination is evaluated. If it is determined that the capacity demand has changed for at least one beam in the beam cluster (Yes at step S320), the method proceeds to step S330. Otherwise (No at step S320), the method returns to step S310.

At step S330, an allocation of the channel resource (payload resource) to the beams in the beam cluster is adjusted. This may involve redistributing portions (e.g., units) of the channel resource among the beams in the beam cluster in accordance with respective capacity demands, as assessed in step S310, for example. If the channel resource is the time frame that includes the plurality of time slots (as the portions or units), adjusting the allocation of the channel resource involves allocating respective numbers of time slots per time frame to the beams in the beam cluster. If the channel resource is the frequency band that includes the plurality of frequency sub-bands (as the portions or units), adjusting the allocation of the channel resource involves allocating respective numbers of frequency sub-bands of the frequency band to the beams in the beam cluster. Notably, step S330 may be performed both with respect to the time resource and with respect to the frequency resource, i.e., in embodiments, both the allocation of the time resource and the allocation of the frequency resource may be adjusted.

The portions of the channel resource may be re-distributed among the beams in the beam cluster in such a manner that after the adjustment of the allocation of the channel resource at least one portion of the channel resource is allocated to more than one beam in the beam cluster (i.e., is re-used). If the channel resource is the time resource, this may correspond to at least one time slot being allocated to more than one beam in the beam cluster. In other words, this may correspond to more than one beam being illuminated in the at least one time slot. If the channel resource is the frequency resource, this may correspond to at least one frequency sub-band being allocated to more than one beam in the beam cluster. In other words, this may correspond to more than one beam transmitting in the at least one frequency sub-band. Thus, re-distributing the portions of the channel resource among the beams in the beam cluster may result in co-channel interference (intra-system interference, cross talk) at least for the re-used portion(s) of the channel resource.

After adjusting the allocation of the channel resource, at step S340 an indication of a signal quality is received from one or more terminals in respective areas of coverage for each beam in the beam cluster (i.e., for each area of coverage). These indications may be indications of a degree of interference (cross talk) between signals that are transmitted in beams having adjacent (neighboring) areas of coverage (i.e., adjacent beams). For example, the indications of signal quality may include, or correspond to, channel state information. For each area of coverage, one or more user terminals may assess interference to the signal intended for the respective area of coverage from signals intended for neighboring areas of coverage. To this end, the one or more user terminals may refer to respective pilot signals that are included in the signals transmitted in the beams in the beam cluster and that are periodically repeated. For each area of coverage, the one or more user terminals may transmit relative or absolute signal strengths of the signal intended for the respective area of coverage and signals intended for neighboring areas of coverage to the gateway, via the satellite, as respective indications of signal quality. For a decentralized interference mitigation technique (e.g., MUD) the information is used locally at the user terminals instead.

At step S350, a co-channel interference mitigation technique is applied to the beam cluster (e.g., across the beams in the beam cluster). The co-channel interference technique may be applied in accordance with (e.g., in dependence on) the indications of signal quality received at step S340. In general, the co-channel interference mitigation technique is a technique for mitigating co-channel interference among the signals transmitted in the beams in the beam cluster. The co-channel interference mitigation technique may be performed at the gateway, for example by pre-processing the signals that are fed to the respective beams in the beam cluster.

This co-channel interference mitigation technique may be a centralized technique, such as for example precoding, or a decentralized technique, such as MUD for example.

In embodiments of the disclosure, the co-channel interference mitigation technique may involve, or correspond to, precoding across the beam cluster (i.e., across the beams in the beam cluster). In accordance with the above, precoding across the beam cluster may be performed in accordance with the indications of signal quality received at step S340.

In embodiments, steps S340 and S350 may be performed iteratively, i.e., the method may include two or more passes of the sequence of steps S340 and S350.

Subsequently, the method may return to step S310. That is, the method may be performed in a cyclic manner, e.g., periodically. For example, the method of FIG. 3 may be performed every few hours, or daily, for example. Accordingly, the allocation of the channel resource to the beams in the beam cluster may be said to be performed dynamically. If the method is performed in a cyclic manner, it may be checked (alternatively or additionally) at steps S310 and S320 whether a predetermined period of time has elapsed since the last adjustment of the channel resource.

The co-channel interference mitigation scheme described can be greatly reduced in terms of complexity by applying a complexity reduction scheme that takes into account the characteristics of the underlying four color networks (in general, by taking into account the polarization patterns of the beam cluster). Namely, the characteristics of the underlying four color networks imply that for any given user terminal, there is at most one strong co-channel (since other beams re-using common portions of the channel resource would have an orthogonal polarization or would not be close by). For example, according to the complexity reduction scheme the precoding matrix may then can be reduced to a number of 2×2 precoding sub-matrixes, thus greatly simplifying the system.

At most, for particular antenna design (i.e., for particular assignment of polarization patterns to the beams), these sub-matrices might become 3×3 matrices due to the possible contribution by two adjacent beams to the total interference experienced in any terminal location within a beam. In other words, in embodiments the proposed method may involve co-channel interference mitigation (e.g., precoding or MUD) across respective pairs of beams or across respective triplets (i.e., groups of three) of beams at step S350.

Figure 4:
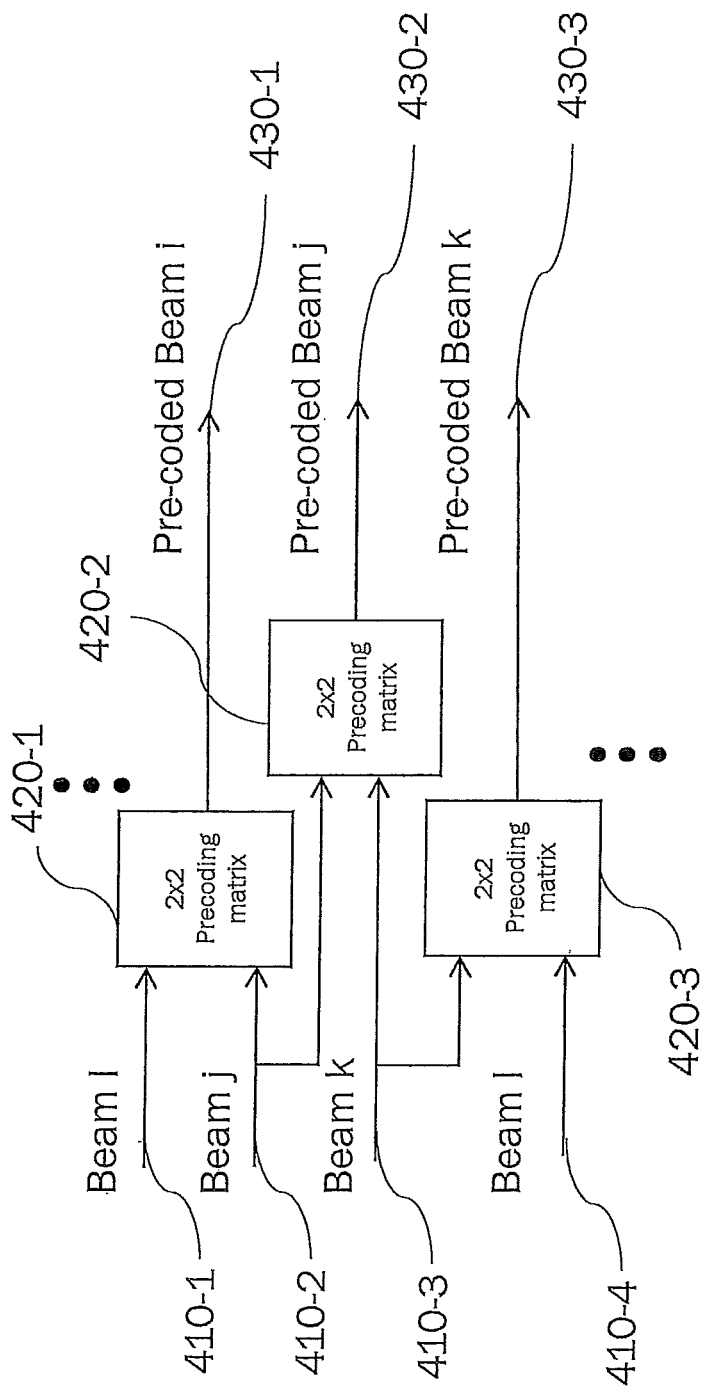

The example of FIG. 4 schematically illustrates precoding across respective pairs of beams. The example assumes a plurality of beams of which only first to fourth beams 410-1, 410-2, 410-3, 410-4 are shown. Precoding is performed across a first pair of beams 410-1, 410-2 using a first 2×2 precoding matrix 420-1 and yielding a first precoded beam 430-1, across a second pair of beams 410-2, 410-3 using a second 2×2 precoding matrix 420-2 and yielding a second precoded beam 430-2, across a third pair of beams 410-3, 410-4 using a third 2×2 precoding matrix 420-3 and yielding a third precoded beam 430-3, and so forth.

In order to partially offset the performance penalty caused by the initial training phase, the gateway (in case of precoding) or the user terminal (in case of MUD) might apply in that short period of time a stored precoding matrix (or set of precoding sub-matrices) which has been computed over similar channel conditions (i.e., set of served beams) during the history of the system's operation or a stored MUD scheme, respectively. In general, in embodiments, the proposed method may involve applying co-channel interference mitigation (e.g., performing precoding or MUD) across the group of beams in accordance with a pre-stored co-channel interference mitigation scheme (e.g., precoding scheme or MUD scheme) until the indications of the signal quality have been established.

In the following description, reference will be exemplarily made to the time frame as the channel resource (payload resource). It is understood however that the following description likewise applies the frequency band as the channel resource. This may require replacing the term time frame by frequency band, and time slot by frequency sub-band in the following description.

The resource allocation algorithm (time illumination plan) is quite simple as the interference-mitigated system might be approximated as interference-free. Therefore, the number of illumination time slots (exemplarily embodying units of the channel resource, the units having identical size) to be assigned to each beam may be computed on the basis of the traffic request (capacity demand) in that beam. More specifically, computation of the number of illumination time slots for a beam in question may be based on the traffic request (capacity demand) in that beam, the spectral efficiency achievable in the absence of interference, and the traffic requests in other beams fed by the same amplifier. For example, the number of illumination time slots to be assigned to each beam may be computed by the traffic request in that beam divided by the spectral efficiency achievable in absence of interference, normalized by the same quantity in the other beams fed by the same amplifier (e.g., TWTA).

For example, the number (first number) of time slots (units) $\tau_j$ to be allocated to the j-th beam may be determined according to $$\tau_j = \frac{\text{Tr\_req}_j / \eta_j}{\sum_{k \in HPA_i} \text{Tr\_req}_k / \eta_k} W, \; j \in HPA_i \qquad [1]$$

where $\text{Tr\_req}_j$ represents the requested traffic for the j-th beam, $\eta_j$ represents the average spectral efficiency for the j-th beam, W represents the Beam-Hopping illumination period (total number of time slots per time frame), and $HPA_i$ indicates the amplifier serving the beam in question.

Figure 5:
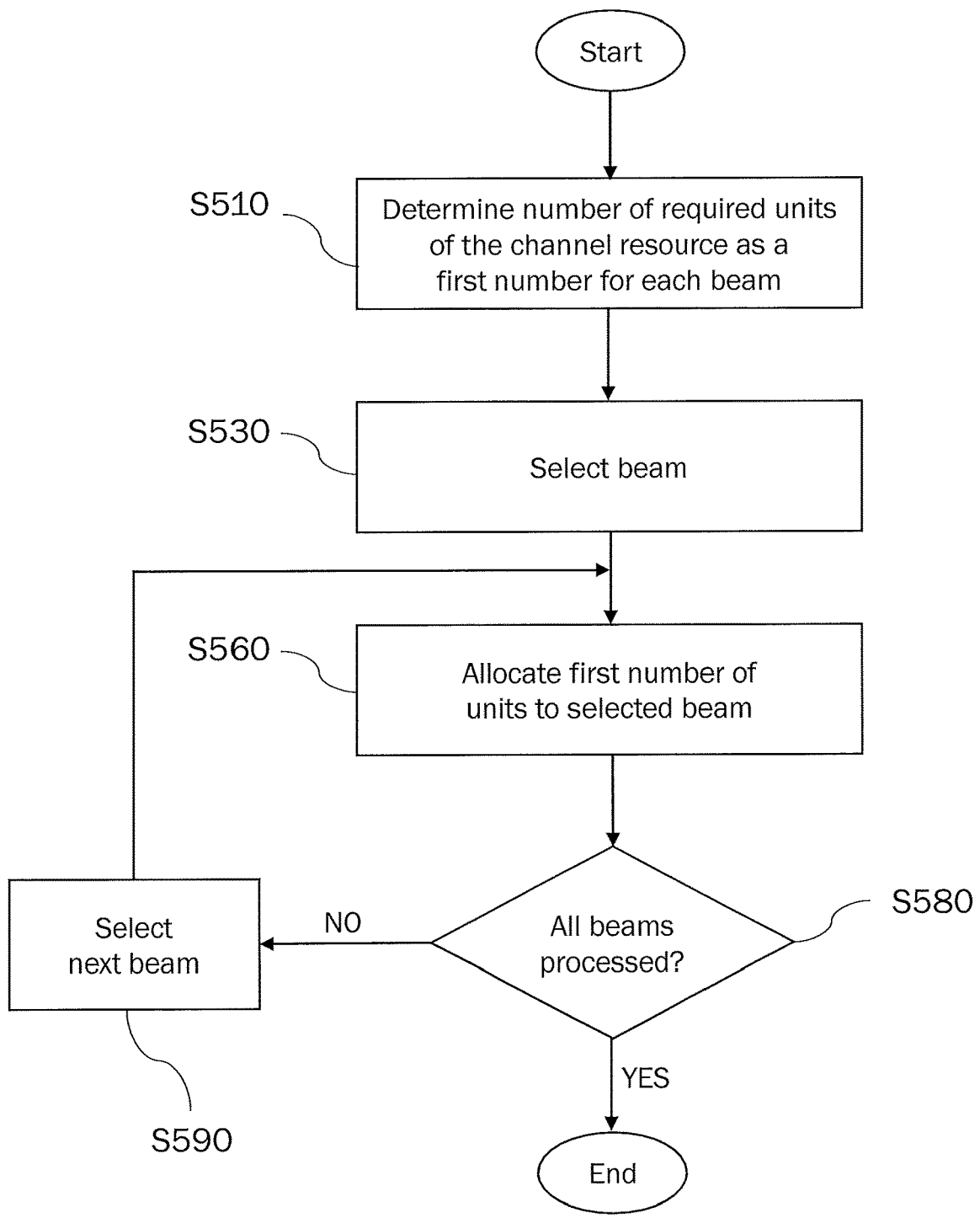
FIG. 5 is a flowchart schematically illustrating an example of details of a step in the flowchart of FIG. 3 according to embodiments of the disclosure, FIG. 6 schematically illustrates an example of co-channel interference (cross talk) between transmission beams in groups of beams that are emitted by a satellite and served by different GWs.

This allocation scheme (that may be used as a scheme for adjusting the allocation of the channel resource at step S330 in FIG. 3) is schematically illustrated in the flowchart of FIG. 5.

At step S510, for each beam in the beam cluster, the number of units of the channel resource for allocating to the respective beam is determined as a first number on the basis of the capacity demand for the respective beam (i.e., the capacity demand for the area of coverage of the respective beam). The first number may be the number of units of the channel resource that need to be allocated to the respective beam in order to meet the capacity demand for that beam, or at least reduce the difference between available capacity and capacity demand to a minimum. Thus, the first number may be proportional to the capacity demand for the respective beam. The first number may be calculated according to Equation [1], for example.

At step S530, a beam among the beams in the beam cluster is selected. Selection may be performed in accordance with a selection scheme. Alternatively, selection may be performed randomly.

At step S560, a number of units corresponding to the respective first number for the selected beam is allocated to the selected beam. Allocation may be performed in accordance with an allocation scheme. For example, this may involve first allocating those units of the channel resource have not already been allocated to another one of the beams in the beam cluster. Notably, each given unit of the channel resource may be allocated to more than one beam in the beam cluster.

At step S580, it is checked whether all beams in the beam cluster have been processed. If any beams in the beam cluster have not yet been processed (No at step S580), the method proceeds to step S590, at which the next (yet unprocessed) beam is selected. This selection may be performed in accordance with the aforementioned selection scheme, or alternatively, in a random manner. Subsequently, the method returns to step S560. On the other hand, if all beams in the beam cluster have already been processed (Yes at step S580), the method ends.

Notably, unless steps require certain steps as prerequisites, the aforementioned steps may be performed in any order and the exemplary order illustrated in FIG. 5 is understood to be non-limiting. For example, the processing of step S510 may be performed after a beam has been selected at step S530, in which case the first number would be determined only for the selected beam. Further in this case, the method would determine the first number for a subsequently selected given beam after the given beam has been selected at step S590.

Figure 6:
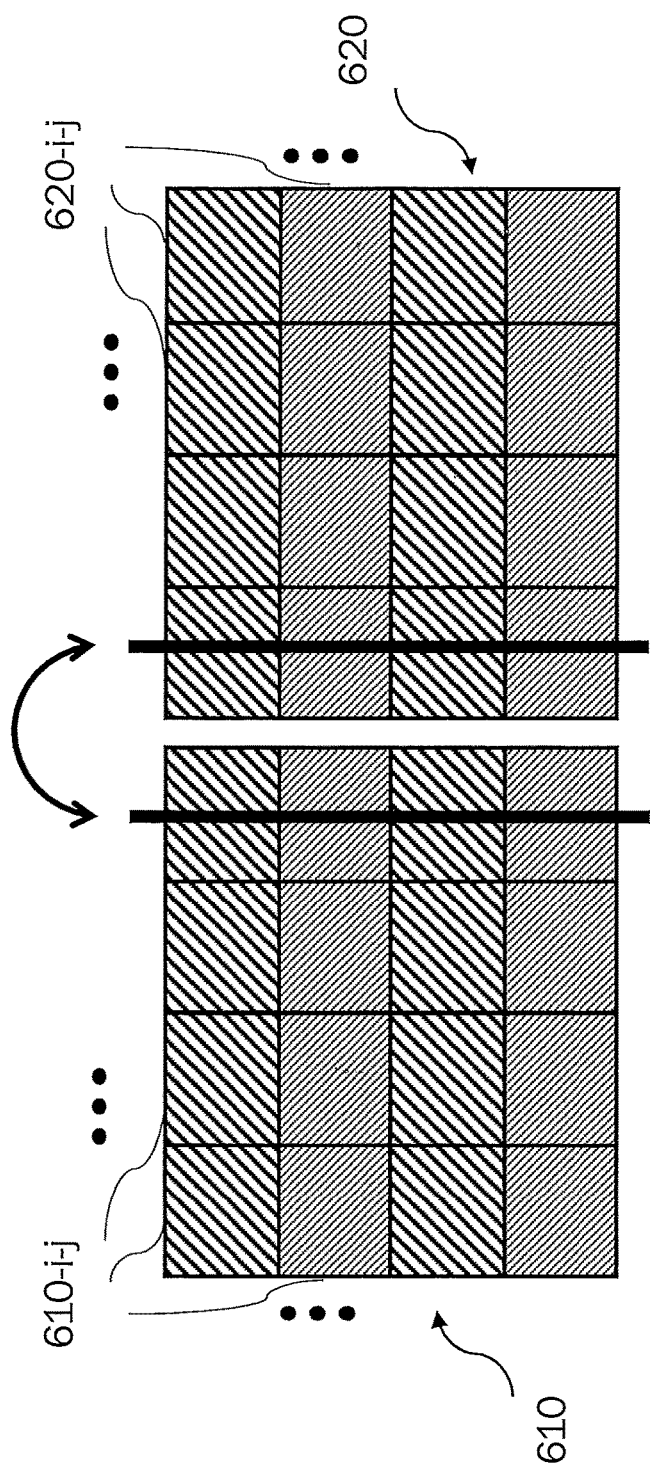

When considering the situation where the satellite network is served by a number of gateways, each addressing the traffic of a cluster of beams (beam cluster), typically the beam cluster is composed by 8 to 16 beams maximum. In this case, co-channel interference mitigation (e.g., precoding or MUD) can be easily applied as e.g., a 16×16 matrix across the full beam cluster. However, the co-channel interference mitigation technique might not be able to resolve co-channel interference between two beams belonging to two different beam clusters. This situation is schematically illustrated in the example of FIG. 6 in which two beam clusters 610, 620 of 16 beams 610-$i$-$j$, 620-$i$-$j$ ($i$=1, . . . , 4, $j$=1, . . . , 4, index i indicating the row of a respective beam in its respective cluster in the drawing, and index j indicating the column of the respective beam in its respective cluster) per gateway are shown. The network uses two polarizations (indicated by different hatching directions) and applies independent co-channel interference mitigation schemes per gateway. As the figure shows, respective ones of beams 610-1-4, 610-2-4, 610-3-4, 610-4-4, 620-1-1, 620-2-1, 620-3-1, 620-4-1 (indicated by vertical lines) at the edge of the two clusters 610, 620 sharing the same polarization would experience high co-channel interference if no special precaution is used, assuming that these beams are scheduled in the same time slots (or re-use the same frequency sub-bands). In order to limit the "cluster border" effects exemplarily illustrated in FIG. 6, the following countermeasures can be taken: gateway cluster aware resource allocation and/or suitable choice of distribution of polarization patterns across the network.

Gateway Cluster Aware Resource Allocation

According to the gateway cluster aware resource allocation algorithm, the allocation of portions of the channel resource (frequency sub-bands or time slots) is done in order to minimize the co-channel interference between adjacent beams belonging to adjacent gateway clusters. The algorithm for generating the illumination table may be based on heuristics.

Broadly speaking, in a first step respective numbers of units of the channel resource (e.g., time slots or frequency sub-bands) that should be allocated to the beams in the beam cluster are computed as described above in the case of one gateway serving the full network. At this point, the illumination table or frequency allocation able is empty.

Second, the computed respective numbers of units that should be allocated to the beams are allocated to those beams in the beam cluster that have neighboring beams in different beam clusters according to the following approach:
(i) The beams in the beam cluster are sorted in descending order with respect to the number of their neighboring beams belonging to different beam clusters. (ii) Starting from the first beam in the sorted table of beams a unit of the channel resource (e.g., time slot or frequency sub-band) is qualified as available (or unallocated) if two conditions are satisfied:
(1) if the channel resource is the time resource, the time slot must not already be used in any other beam served by the same amplifier (e.g., TWTA), and
(2) none of its adjacent beams in the other beam clusters must use the same unit.

Notably, it may happen that there are no slots available (or unallocated) for a given beam. In such a case, condition (2) may be neglected, and the allocation algorithm allows having interference in a neighboring beam. This procedure is repeated until all the units computed in the first step for the beams with neighboring beams in different beam clusters are assigned.

Third, the time slots corresponding to the other beams in the beam cluster, i.e., beams that do not have neighbors in different beam clusters, are assigned in a random manner (i.e., units of the channel resource are allocated to these beams until the respective number computed in the first step is reached). In this case, the only condition that must be respected for a time slot to be available (or unallocated) is not to have already been assigned to a beam served by the same amplifier (e.g., TWTA).

This allocation scheme (that may be used as a scheme for adjusting the allocation of the channel resource at step S330 in FIG. 3) will now be described in more detail with reference to the schematic flowchart of FIG. 7, which assumes that the satellite comprises, in addition to the beam cluster (group of beams), one or more further beam clusters (groups of beams). The allocation schemes further assumes that the beams in the one or more further beams clusters are already fully allocated.

At step S710, for each beam in the beam cluster, the number of units of the channel resource for allocating to the respective beam is determined as a first number on the basis of the capacity demand for the respective beam (i.e., the capacity demand for the area of coverage of the respective beam). Step S710 may be identical to step S510 described above. Thus, the number of units of the channel resource (e.g., time slots or frequency sub-bands) to be allocated to each beam in the beam cluster is computed as described above in the case of one gateway serving the full network. Notably, at this point the time illumination table or frequency assignment table is empty, since no time-slots or frequency sub-bands have been assigned yet.

At step S720, for each beam in the beam cluster, a number of beams in the one or more further beam clusters that have their respective areas of coverage adjacent to the area of coverage of the respective beam is determined as a second number. For simplicity, such beams in the one or more further beam clusters may be referred to as adjacent beams or neighboring beams. Beams in the beam cluster with a high second number have more adjacent beams in other beam clusters and thus are expected to experience more interference from other beam clusters than beams with a low second number. Notably, only beams with their area of coverage at the border of the beam cluster are expected to have respective second numbers different from zero. The beams in the beam cluster may be sorted in descending order with respect to the number (second number) of their neighboring (adjacent) beams belonging to different beam clusters.

At step S730, the beam in the beam cluster with the highest second number is selected. If several beams in the beam cluster share a highest second number, selection may be performed in accordance with a selection scheme. Alternatively, selection may be performed in a random manner among the beams sharing the same highest second number.

At step S740, it is checked whether the first number of units of the channel resource has already been allocated to the selected beam. If the first number of units of the channel resource has already been allocated to the selected beam (Yes at step S740), the method proceeds to step S780. Otherwise (No at step S740), the method proceeds to step S750. At the first pass, no units of the channel resource would have been allocated to the selected beam. Notably, each beam is fully allocated with a number of units equal to the first number for the respective beam until the next beam is processed.

At step S750, it is checked whether unallocated units (available units) of the channel resource are available. Specifically, all those units of the channel resource are treated as unallocated units that are not already allocated to any one of the beams in the one or more further beam clusters that have their respective areas of coverage adjacent to the area of coverage of the selected beam. If such unallocated units of the channel resource are available (Yes at step S750), the method proceeds to step S760. Otherwise (No at step S750), the method proceeds to step S770.

At step S760, an unallocated unit of the channel resource (i.e., a unit that has not already been allocated to any one of the beams in the one or more further beam clusters with their respective areas of coverage adjacent to the area of coverage of the selected beam) is allocated to the selected beam. This allocation may be performed in accordance with an allocation scheme. Alternatively, one of the available unallocated units may be randomly selected for allocation to the selected beam.

Notably, steps S750 and S760 may further be performed in a manner ensuring that, if the channel resource is the time resource (i.e., the time frame), a time slot is allocated to the selected beam that is not already allocated to a beam (in the beam cluster) that is served by the same amplifier (e.g., TWTA) as the selected beam. This may involve additionally checking, at step S750, whether any time slots are available that are not already allocated to a beam (in the beam cluster) that is served by the same amplifier as the selected beam, and only treating those units as unallocated units (available units) that are not already allocated to any adjacent beam in the one or more further beam clusters or to a beam (in the beam cluster) served by the same amplifier as the selected beam.

At step S770, if no unallocated units are available, a unit of the channel resource that has already been allocated to one or more of the adjacent beams is allocated to the selected beam. Preferably, a unit of the channel resource may be allocated at this step that is already allocated to as few adjacent beams as possible.

At step S780, it is checked whether all beams in the beam cluster have been processed. If any beams in the beam cluster have not yet been processed (No at step S780), the method proceeds to step S790, at which the beam with the next highest second number is selected. For more than one beam in the beam cluster sharing the next highest second number, selection may be performed in accordance with the aforementioned selection scheme in step S730. Subsequently, the method returns to step S740. On the other hand, if all beams in the beam cluster have already been processed (Yes at step S780), the method ends.

Figure 7:
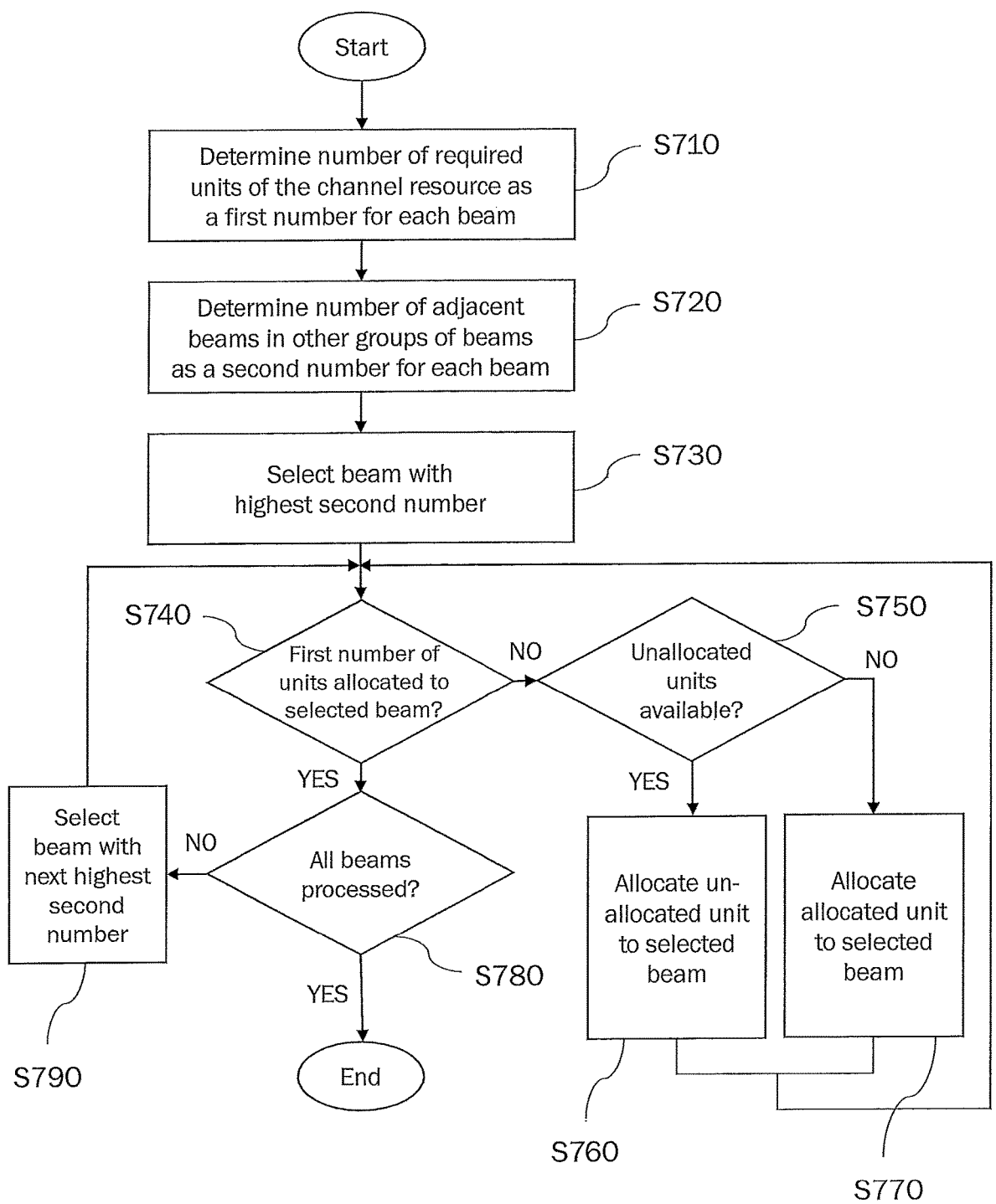
FIG. 7 is a flowchart schematically illustrating another example of details of a step in the flowchart of FIG. 3 according to embodiments of the disclosure, FIG. 8A and FIG. 8B schematically illustrate an example of co-channel interference (cross talk) between transmission beams in groups of beams that are emitted by a satellite and served by different GWs, with and without adjustment of polarization patterns according to embodiments of the disclosure.

In summary, the adjusting of the channel resource according to FIG. 7 may be said to be performed in a beam-wise manner in the order of the associated second numbers of the beams in the beam cluster, starting with the beam having the highest second number. The adjusting of the channel resource may be further said to include, for each of the beams in the beam cluster, first allocating those units of the channel resource to the respective beam that are not already allocated to any one of the beams in the one or more further groups of beams that have their respective areas of coverage adjacent to the area of coverage of the respective beam.

For beams in the beam cluster that have zero as the second number (i.e., that have no adjacent beams in the one or more further beam clusters, for example since they are not arranged at the border of the beam cluster), allocation of the first number of units of the channel resource may be performed in accordance with an alternative scheme. For example, steps S750 to S770 may be omitted, and allocation of units of the channel resource may be performed in a random manner. If the channel resource is the time resource, it may be ensured that only units are allocated to a given beam that are not already allocated to a beam (in the beam cluster) served by the same amplifier as the given beam.

Notably, unless steps require certain steps as prerequisites, the aforementioned steps may be performed in any order and the exemplary order illustrated in FIG. 7 is understood to be non-limiting. For example, the processing of step S710 may be performed after each beam has been selected, in which case the first number would only be determined for the respective selected beam.

The above algorithm can be described formally with the following pseudocode for the exemplary case of the channel resource being the time resource:

1. Categorize the beams in the beam cluster in two types:
    (a) beams with neighbors in different beam clusters, B_neigh_cluster
    (b) beams with no neighbors in different clusters, B_wo_neigh_cluster
2. Sort B_neigh_cluster beams in decreasing order according to the beams' respective number (N_neigh_cluster) of neighbors in different beam clusters, B_neigh_cluster_sorted
3. While (N_slots_still_to_be_allocated_for_beams_type(a)≠0)
       for i=1 to length(B_neigh_cluster)
           beami=B_neigh_cluster_sorted(i)
           available_Ts=find(Time slots available of
              HPA(beami)
           chosen_slot=available_Ts(1:N slots for beami)
       end
4. Allocate randomly the remaining time slots to the beams of type (b).

Suitable Choice of Distribution of Polarization Patterns

Figure 8A:
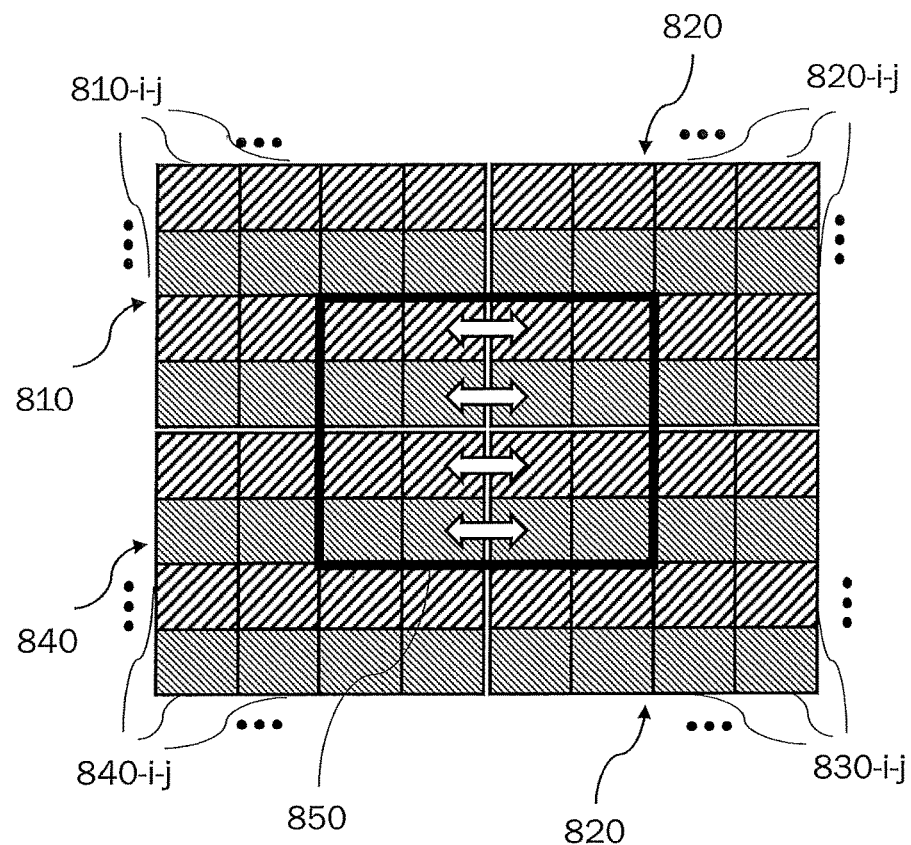

A partial countermeasure that can be used to mitigate interference from beams in other beam clusters is a careful distribution of the polarization across the network. This approach is graphically described in the example of FIG. 8A and FIG. 8B. The two shown beam patterns have different distribution of polarizations (the two hatching directions are associated with the two polarizations) across the network. Four adjacent gateway clusters (beam clusters served by different gateways) 810, 820, 830, 840 each of 16 beams 810-$i$-$j$, 820-$i$-$j$, 830-$i$-$j$, 840-$i$-$j$ ($i$=1, . . . , 4, $j$=1, . . . , 4, index $i$ indicating the row of a respective beam in its respective cluster in the drawing, and index $j$ indicating the column of the respective beam in its respective cluster) are shown.

Figure 8B:
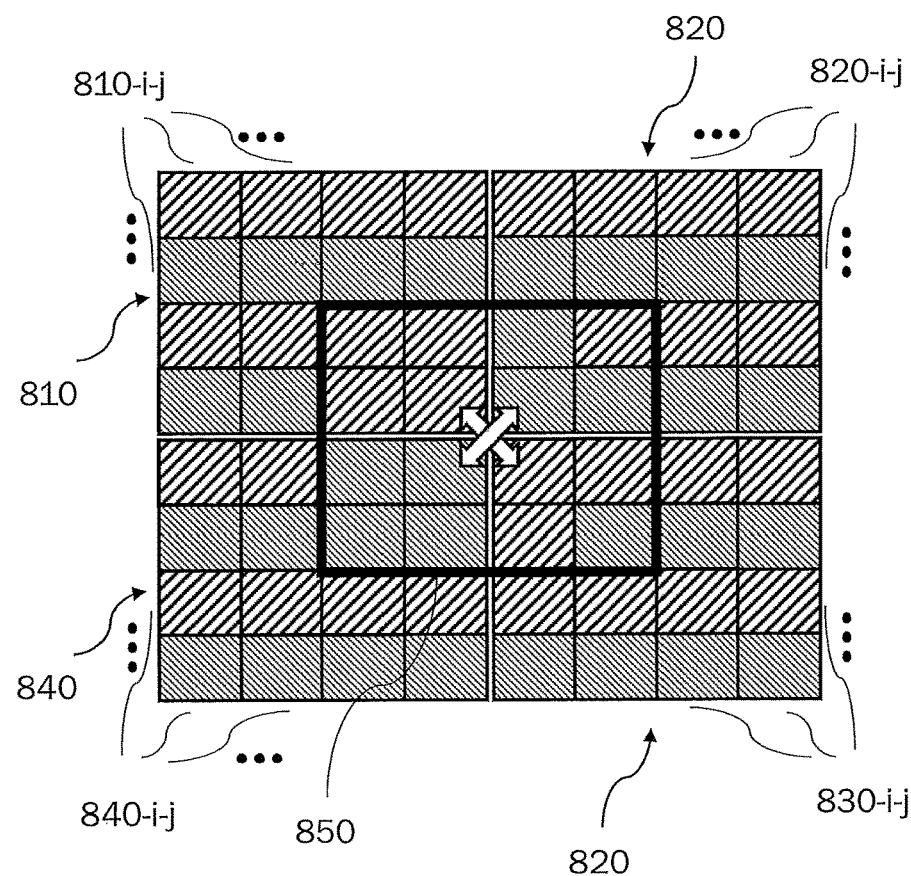

Assuming that the highlighted set 850 of 16 beams (inside the solid square in the center), which spans over the four beam clusters 810, 820, 830, 840, is known a priori to be a high traffic area, the polarization distribution scheme in FIG. 8B minimizes the co-channel interference when applied in the presence of intra-cluster co-channel interference mitigation. Indeed, in FIG. 8B only four beams (namely beams 810-4-4, 820-4-1, 830-1-4, and 840-1-1) are possibly interfering with each other as opposed to eight beams (namely beams 810-3-4, 810-4-4, 820-3-1, 820-3-2, 830-1-4, 830-2-4, 840-1-1, and 840-2-1) when using the polarization scheme in FIG. 8A. Using the polarization scheme of FIG. 8B, interference takes place between beams at higher distance than in the case of the scenario in FIG. 8A.

In general, assuming that there are one or more further beam clusters (groups of beams) served by different gateways in addition to the beam cluster for which co-channel interference mitigation is performed, the proposed method may further include a step of adjusting a polarization pattern for those beams in the group of beams or the one or more further groups of beams, whose area of coverage is adjacent to an area of coverage belonging to a beam in a different one of the group of beams or the one or more further groups of beams. That is, a polarization pattern of adjacent beams in different beam clusters may be adjusted. In particular, the polarization pattern may be adjusted such that distances between areas of coverage of beams with the same polarization in different ones of the beam clusters and the one or more further beam clusters are maximized. Maximizing the distances between the areas of coverage may relate to maximizing a mean distance between locations within these areas, or maximizing any other suitable cost function of distances of locations within these areas.

Flexible Power Allocation in the Presence of Co-Channel Interference Mitigation

An additional improvement in flexibility in the context of the proposed method can be provided by flexibly allocating the transmission power to the beams in the beam cluster in dependence on (e.g., in accordance with) their capacity request (capacity demand). Differently to conventional systems without co-channel interference mitigation, when using co-channel interference mitigation (e.g., precoding or MUD), any beam power unbalance results in direct throughput improvement due to the reduction of intra-system interference. This can be achieved by replacing conventional tubes with either FlexTWTAs or MPAs. The latter are more suitable for this technique as they allow in a larger dynamic range, therefore being able to provide a more flexible power partitioning among the beams. Notwithstanding, the present disclosure is not limited to FlexTWTAs, and any suitable amplifier devices may be employed in the context of the proposed method.

In the following, reference will be exemplarily made to precoding as the co-channel interference mitigation technique, but it is understood that the following disclosure may be likewise applied to other co-channel interference mitigation techniques, such as for example MUD.

The precoding algorithm in the presence of non-uniform power unbalance has to be modified as follows.

For example, if a linear precoding algorithm of the Minimum Mean Square Error (MMSE) variant is employed to calculate the precoding matrix W from the channel matrix H (both with complex elements), the calculation of the precoding matrix in the presence of non-uniform power is as follows:

$$W = [H^H \text{diag}(P) H + I]^{-1} H^H \text{diag}(P) \quad [2]$$

where $P=[P_i]$, $P_i$ is the power emitted from feed i, I is the identity matrix, and $H^H$ is the Hermitian conjugate of matrix H. The dimensions of H, W, and I may be 2×2 or 3×3 if the complexity reduction scheme described above is applied. The power unbalance of the system is reflected by the vector P with one entry per transmit feed. If $W_i$ is a row of the precoding matrix, the following norm must be calculated in order to check whether any of the rows of W violates the maximum power available from the totality of on-board amplifiers (e.g., HPAs), $$n = \text{norm}(W_i)^2 \quad [3]$$

Then, if n>1, the following normalization is in order to ensure that the total power is not exceeding the total available power on board, $$\tilde{W}_i = \frac{1}{\sqrt{n}} W_i \quad [4]$$

The optimization of the power allocation algorithm is in in general a non-trivial task. An efficient technique for flexible power allocation will be presented in the following with reference to the flowchart of FIG. 9. The presented technique adopts a heuristic approach and assumes that the power among a group of beams may be pooled (i.e., re-distributed among these beams). The steps described below may be performed after step S350 in FIG. 3, for example. In general, the steps described below may be performed whenever the allocation of the channel resource is adjusted (and the co-channel interference mitigation technique is performed). Without intended limitation, the following description exemplarily assumes that the channel resource is the time resource.

In a first iteration, the capacities of the beams when applying beam-hopping combined with co-channel interference mitigation described above are calculated, with equal power among the beams. At this point, the unmet capacity (and optionally, the unused capacity) for each beam is computed, as well as the additional power needed for each beam (at each time slot) to fill the gap and be able to satisfy all the requested capacity (and optionally, a possible power reduction that may be possible for beams for which there is unused capacity in the beam).

In order to do so, at step S910, a beam among the beams in the beam cluster is selected. Selection may be random at this point.

At step S920, a difference between the capacity demand for the selected beam and the available capacity for the selected beam is determined (computed). In other words, the unmet capacity (positive difference) or the unused capacity (negative difference) is determined.

Then, at step S930, a necessary change $\Delta P_i$ in transmission power $P_i$ for the selected beam that would minimize (or altogether remove) the difference determined at step S920 is determined (calculated). The change (change amount) $\Delta P_i$ may be an increment or decrement in transmission power $P_i$. Starting from the Shannon bound, the change $\Delta P_i$ in transmission power $P_i$ is obtained by solving $$\frac{T_{unmet_i}}{\tau_i} = \frac{B}{W} \cdot \left[ \log_2 \left( \frac{(SNR_i \cdot \Delta P_i) + 1}{SNR_i + 1} \right) \right] \quad [5]$$

where $T_{unmet_i}$ is the unmet capacity of the selected (i.e., i-th) beam, B is the band served by each amplifier, W is the number of time slots in the beam hopping window (i.e., in the time frame), $SNR_i$ is the average Signal-to-Noise-Ratio (SNR) of the i-th beam assuming uniform power. Notably, Equation [5] can be applied also to beams having unused capacity, by defining unused capacity as negative unmet capacity (i.e., by using the negative value of the unused capacity as the unmet capacity in Equation [5]). Inverting Equation [5] yields $$\Delta P_i = \frac{\left[2\left(\frac{T_{unmet_i}}{\tau_i}\frac{W}{B}\right)\cdot(SNR_i+1)\right]-1}{SNR_i}$$ [6]

At step S940 it is then determined whether all beams in the beam cluster have been processed. If so (Yes at step S940), the method proceeds to step S960. Otherwise (No at step S940), the method proceeds to step S950, at which the next beam is selected. Selection may be random at this point, as long as each beam is processed in the course of the method.

Alternatively, the difference between the capacity demand and the available capacity, as well as the necessary change in transmission power may be determined for all relevant beams (i.e., for the whole beam cluster or a sub-group thereof) in a single step, instead of successively determining these quantities for each beam.

At step S960, for each beam in the beam cluster, a normalized transmission power is determined (calculated). For example, the un-normalized transmission power for the selected beam may be computed as $$P_i = P_{un} + \Delta P_i$$ [7]

where $P_{un}$ is the transmission power per beam in the uniform power case. Notably, this computation does not yet ensure any constraint on the total power. Therefore, in order to introduce a constraint on the total power to be kept constant among a number of beams k, the following constraint needs to be satisfied at each time slot of the beam hopping frame (time frame), $$\sum_{i=1}^{k} P_i = P_{tot}$$ [8]

where $P_i$ is the transmission power assigned to the i-th beam, and $P_{tot}$ is the total power available for the k beams. Notably, the k beams may be all beams in the beam cluster, or may be a sub-group of the beams in the beam cluster (e.g., a sub-group of beams for which the transmission power may be pooled). A normalization factor C is applied to the un-normalized transmission powers $P_i$ (after having applied the determined change $\Delta P_i$ in transmission power) in order to meet this constraint, where the normalization factor is given by $$C = \frac{\sum_{i=1}^{k} P_i}{P_{tot}}$$ [9]

The final corrected (normalized) transmission power $PC_i$ for the i-th beam then is given by $$PC_i = \frac{1}{C}\cdot P_i$$ [10]

in order to keep the system total power constant.

At step S970, the normalized transmission powers determined step S960 are applied to respective beams. This may involve performing control operations of the amplifier devices that serve the respective beams.

Figure 9:
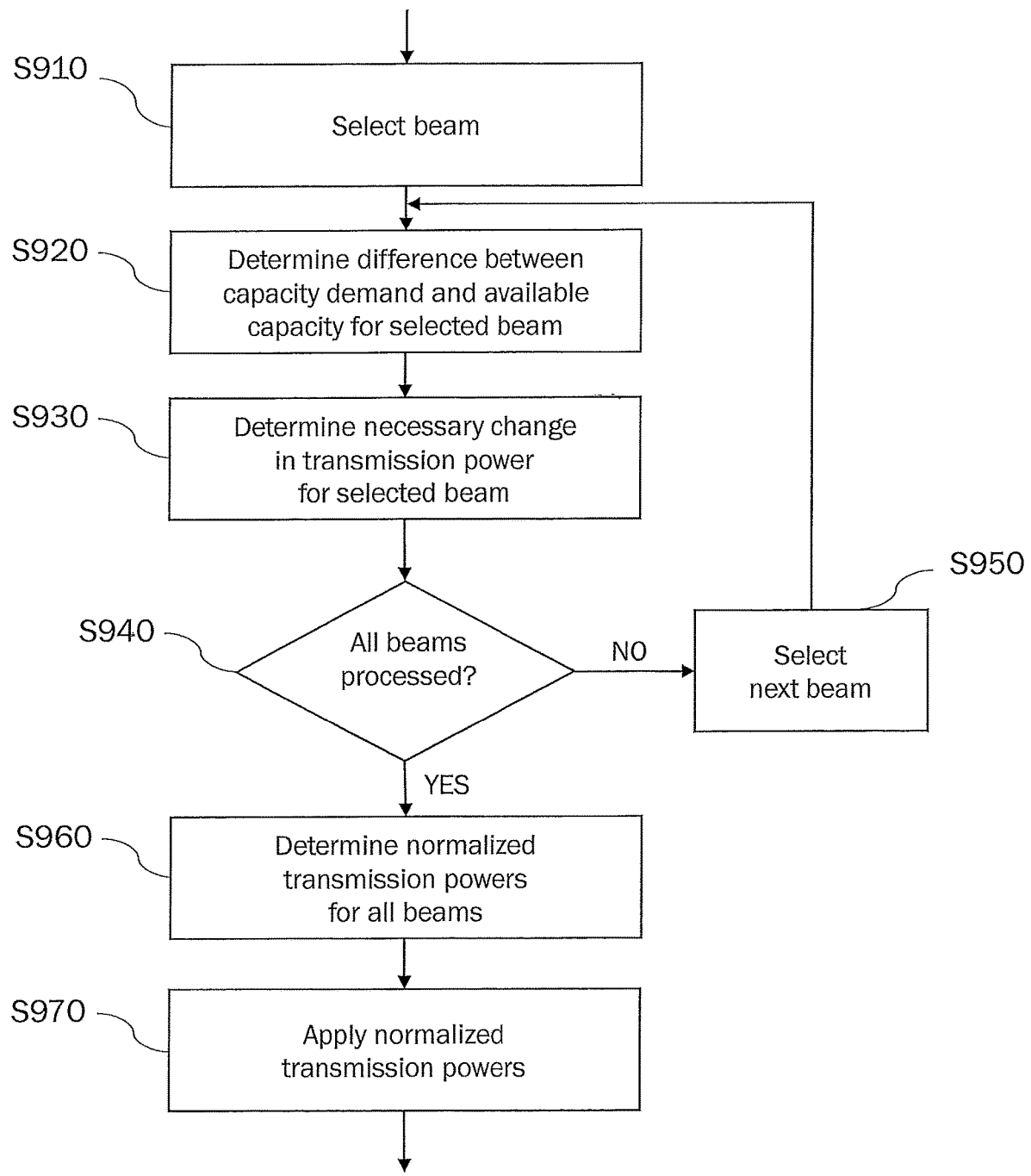
FIG. 9 is a flowchart schematically illustrating further steps of the example of a method of controlling transmission of signals in a group of transmission beams emitted by a satellite according to embodiments of the disclosure.

The method of FIG. 9 may be performed iteratively. That is, after step S970, the method may return to step S910 (or to a single step for determining the differences between the capacity demands and the available capacities, as well as the necessary changes in transmission power). The transmission powers for the relevant beams may be adjusted at each instance of step S970 until an exit criterion (exit condition) is met. This exit criterion may relate to (a function of) the unmet or unused capacities dropping below a predetermined threshold, or the number of iterations exceeding a predetermined number, for example.

Notably, the flexible power allocation scheme and the method of FIG. 9 need not be performed for all beams in the network, but may be performed for a sub-group of beams, as long as the transmission power for the sub-group of beams can be pooled.

Figure 10:
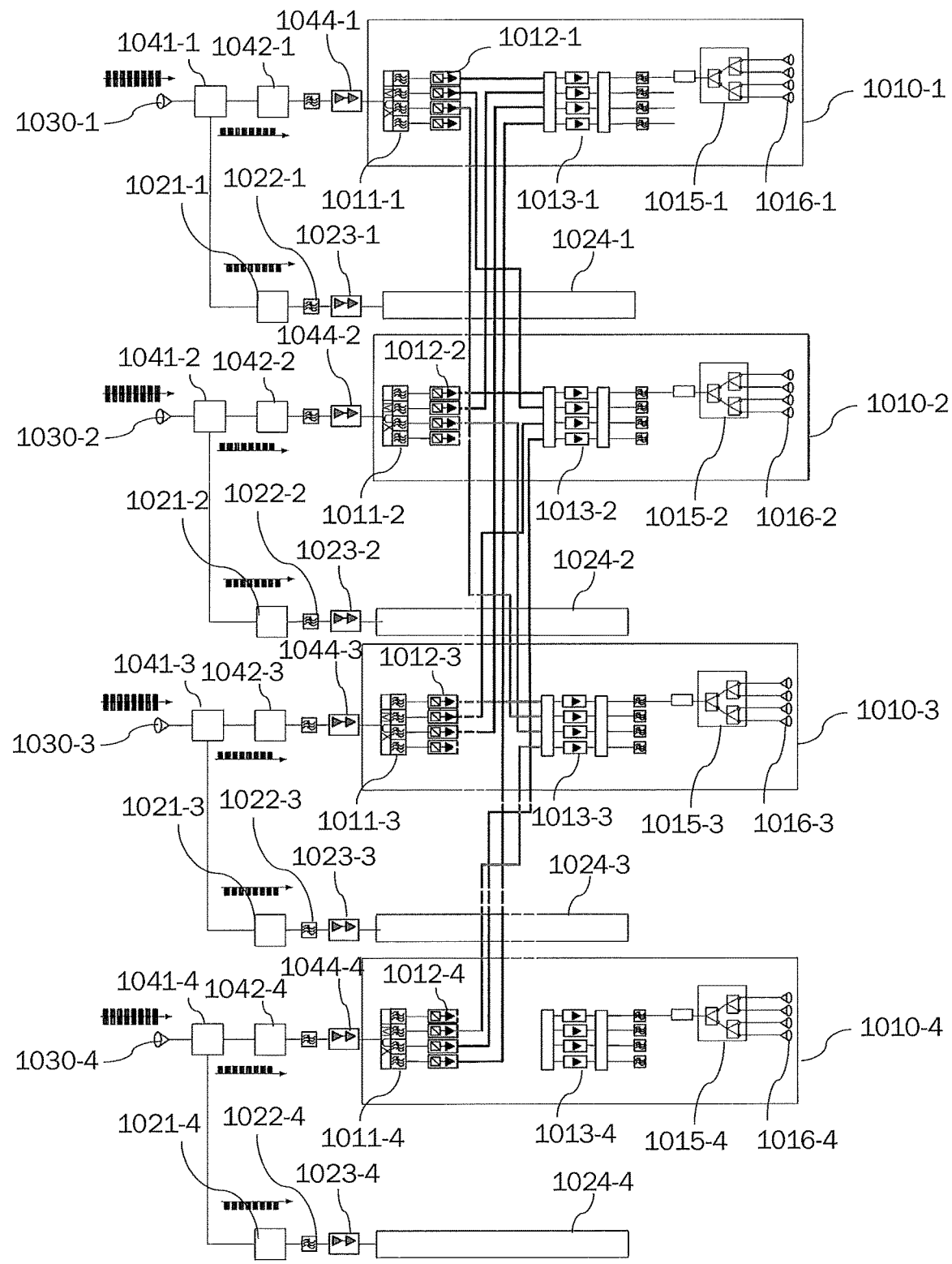
FIG. 10 is a block diagram schematically illustrating an example of a forward link payload for implementing the method of controlling transmission of signals in a group of transmission beams emitted by a satellite according to embodiments of the disclosure.

FIG. 10 shows a block diagram of a forward link payload implementing beam hopping with MPAs. In this figure, reference 1010-i denotes a forward link block, reference 1011-i denotes an input demultiplexer, reference 1012-i denotes a down converter, reference 1013-i denotes an MPA, reference 1015-i denotes a switch, reference 1016-i denotes a user link antenna feed, reference 1021-i denotes a duplexing filter, reference 1022-i denotes an input filter, reference 1023-i denotes a low noise amplifier, and reference 1024-i denotes a forward link block (i=1, . . . , 4).

It is to be noted that if the above scheme is used with MPAs, one has to be careful in assigning beams to MPAs, as a good performance of these devices requires very low correlation among the carriers sharing the MPA. This means that carriers across with co-channel interference mitigation is performed (e.g., carriers which are precoded together), in principle should not be using the same MPA. This might imply that each MPA should be fed only by carriers uplinked by different gateways (as they would feed beams in different clusters and thus not precoded by the same precoded matrix). However, even within the same precoding matrix, beams which are not in proximity of each other might experience only low correlation after co-channel interference mitigation, which may be acceptable by the MPA.

At the implementation level, the proposed method may involve control of transmission circuitry of the satellite in order to adjust the allocation of the channel resource, such as (part of) the transmission circuitry illustrated in FIG. 10. The proposed method may further involve co-channel interference mitigation performed on ground, e.g., at the gateway, which relates to specific schemes for allocating different data feeds to different beams of the beam cluster, i.e., which relates to a pre-processing of the data feeds prior to transmission to the satellite.

The proposed method may further involve controlling amplifier devices included in the transmission circuitry of the satellite, in order to flexibly allocate the transmission power to the beams. The method may be performed by an apparatus for controlling transmission in a group of beams emitted by a satellite. The apparatus may comprise a receiver for receiving the indications of signal quality and a controller configured to perform the remaining ones of the aforementioned method steps. The apparatus may be provided at, or implemented by a ground station (e.g., gateway). The controller may be implemented by one or more CPUs, for example.

Simulation results show that the proposed method allows to significantly reduce the discrepancy between the total usable system capacity and the offered system capacity for realistic use cases.

FIG. 11 to FIG. 14 illustrate a simulated scenario for 64 beams of a geo-stationary multi-beam satellite situated at 30 degrees Western longitude, with a coverage area in the northern hemisphere including Europe, parts of North Africa, and the north-eastern part of North America. The simulation assumes coverage of Europe, and a DVBS2X air interface (with roll_off=20%). The simulation assumes a downlink frequency of 20 GHz (K band), a carrier bandwidth of 500 MHz, 16 TWTAs (each HPA alternatively illuminating 4 beams), one carrier per TWTA, an equivalent isotropically radiated power (EIRP) of 65 dBW, and single polarization.

Figure 11:
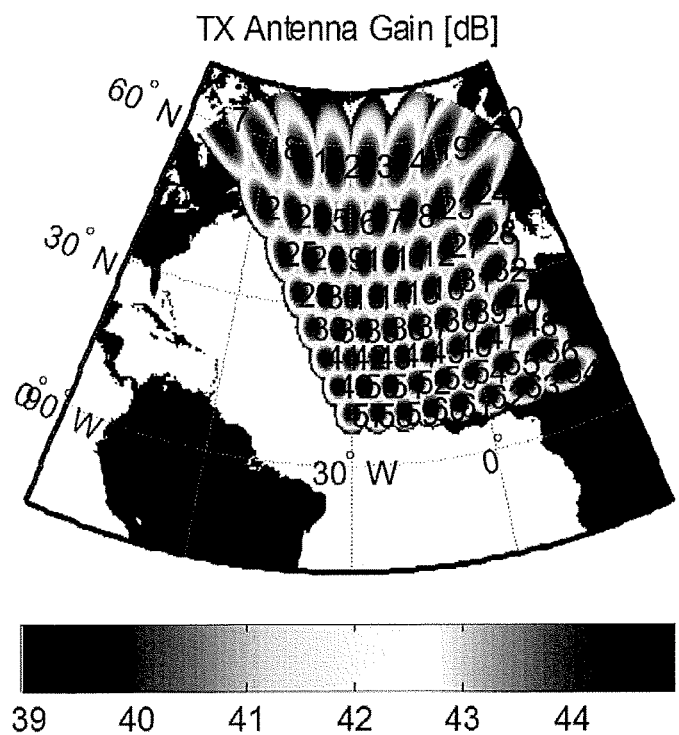
FIG. 11, FIG. 12, FIG. 13, and FIG. 14 illustrate a simulated scenario that implements the method of controlling transmission of signals in a group of transmission beams emitted by a satellite according to embodiments of the disclosure.

The antenna pattern of the multi-beam satellite is shown in FIG. 11, which also illustrates the transmission antenna gain in dB for each beam.

Figure 12:
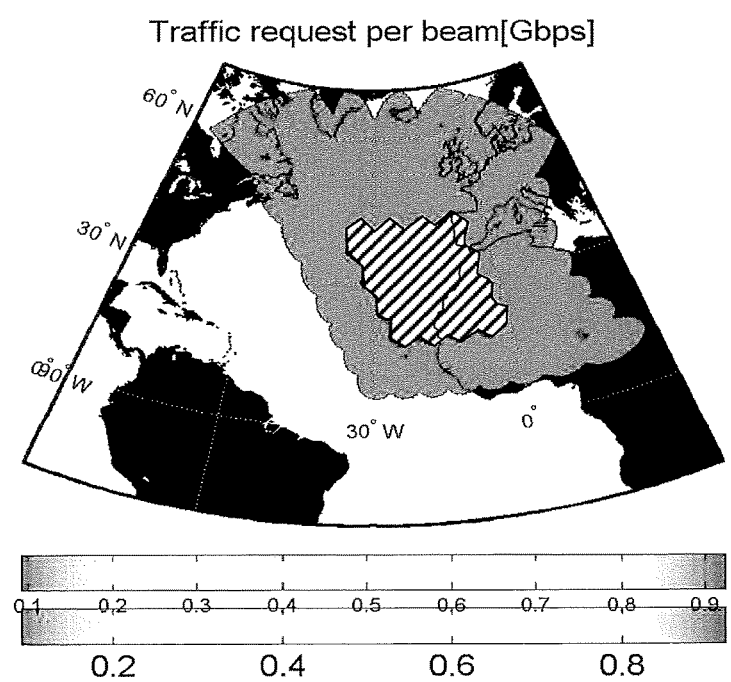

According to the simulation, 16 central beams out of the 64 beams are 'hot' beams each requesting ~920 Mbps and the remaining 48 beams are 'cold' beams each requesting 10 times less traffic than the hot ones, i.e., ~92 Mbps. This is shown in FIG. 12, in which the light-grey area indicates cold beams and the hatched area in the center indicates the hot beams.

In the simulated scenario, the theoretical upper bound for the offered capacity (in Gb per window length) is 19.245, and the theoretical upper bound for the usable capacity (in Gb per window length) is 18.565.

Figure 13:
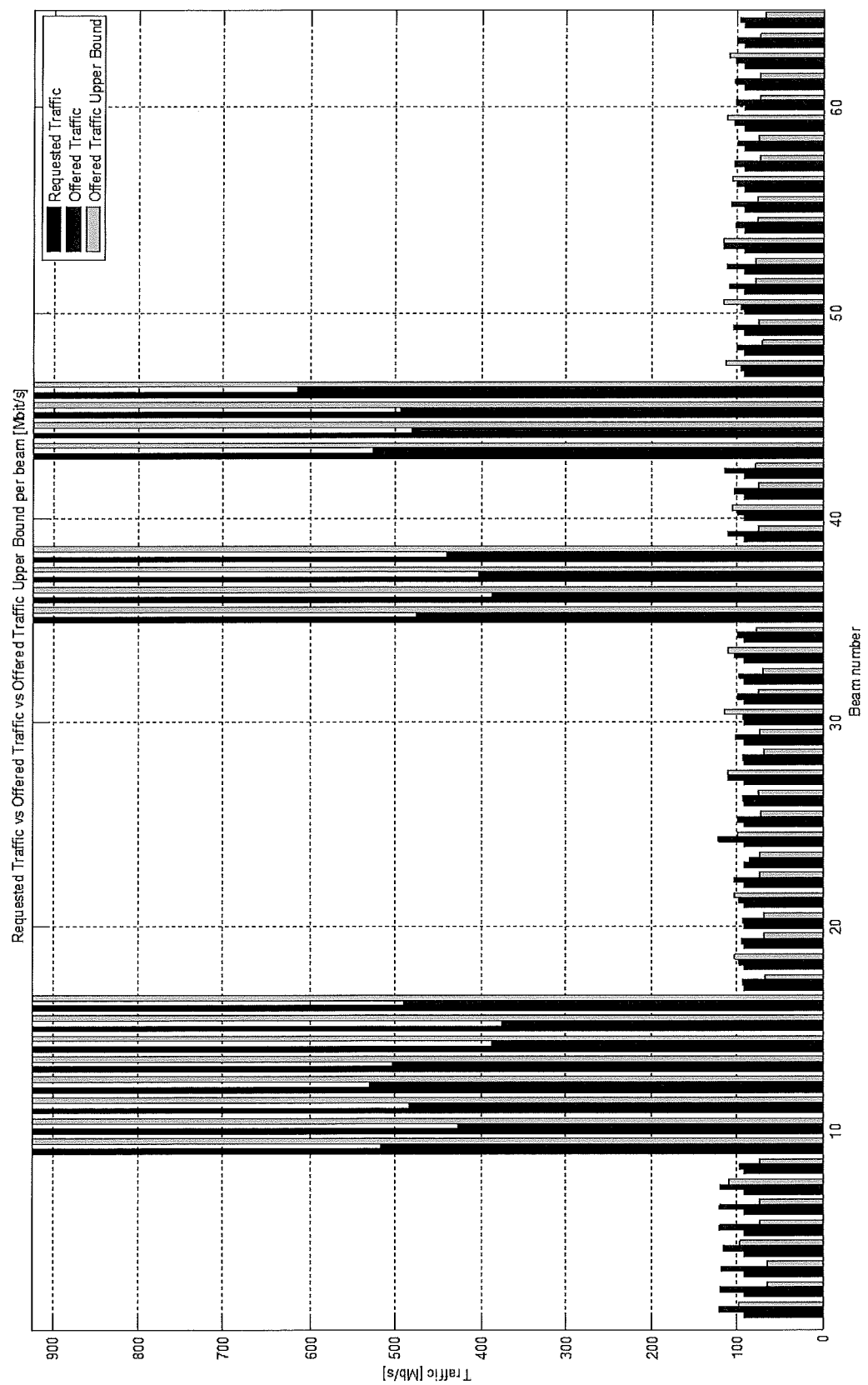
Figure 14:
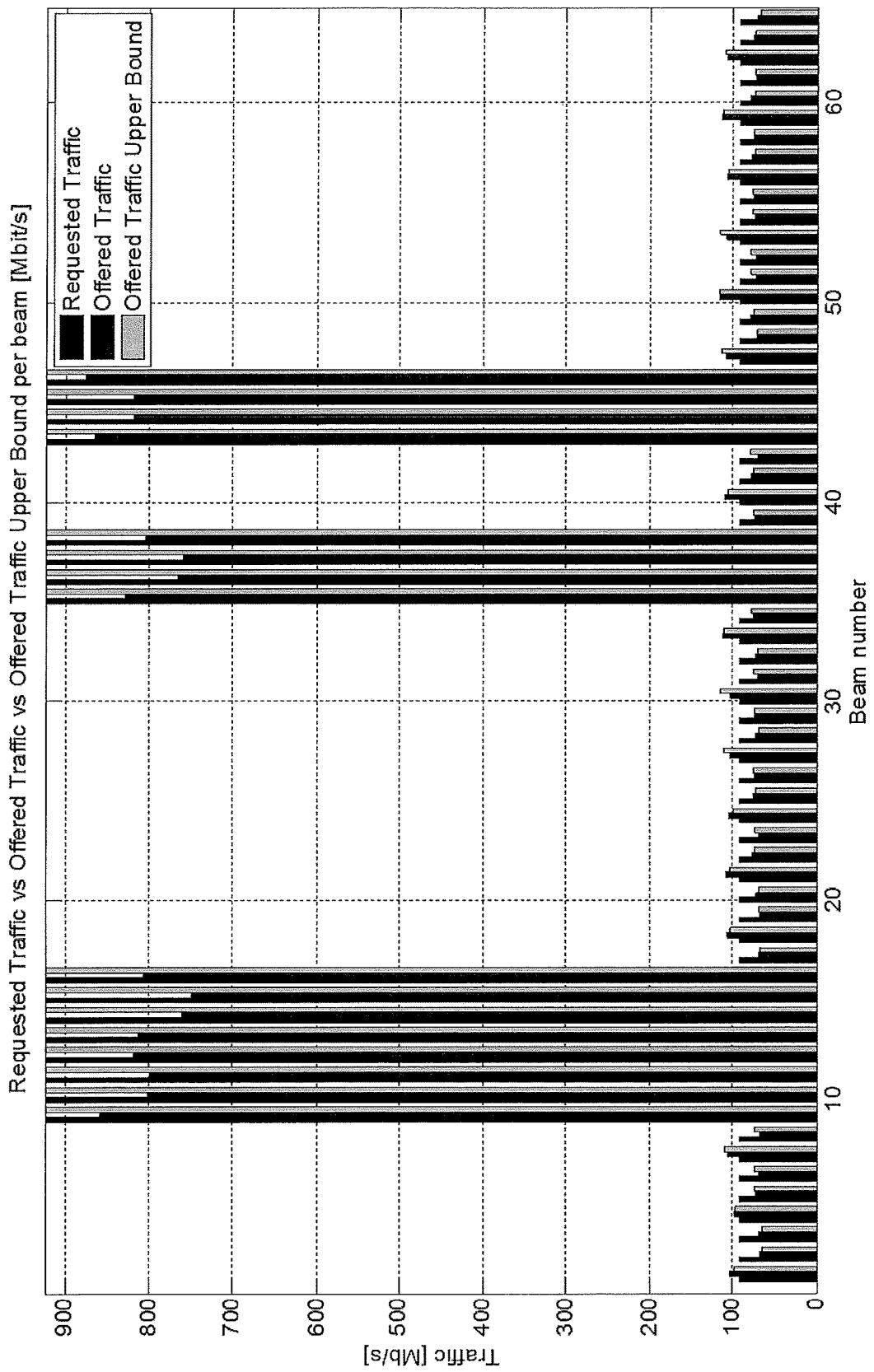

FIG. 13 contrasts, for each of the 64 beams, the requested traffic to the offered traffic and to the upper bound for the offered traffic for a flexible time allocation scheme (beam hopping). FIG. 14 illustrates the same quantities when applying the proposed method. In each of these figures, the vertical bars for each of the 64 beams indicate, from left to right, the requested traffic (dark grey), the offered traffic (grey), and the upper bound for the offered traffic (light grey).

As can be seen from FIG. 13, there is a significant discrepancy between respective requested traffics and offered traffics for at least the 16 hot beams (i.e., beams 9-16, 35-38, and 43-46) when applying beam hopping only. Quantitatively, applying beam hopping results in an offered capacity of 12.513 GB/window length and a usable capacity of 11.951 GB/window length for the assumed scenario.

On the other hand, as can be seen from FIG. 14, the discrepancy between the respective requested traffics and offered traffics for the hot beams is significantly reduced when applying the proposed method. Quantitatively, applying the proposed method results in an offered capacity of 16.976 GB/window length and a usable capacity of 16.731 GB/window length for the assumed scenario, which amounts to an improvement compared to the beam hopping scenario of about 40% for the usable capacity.

It should be noted that the method features described above correspond to respective apparatus features that may however not be explicitly described, for reasons of conciseness. The disclosure of the present document is considered to extend also to such apparatus features. In particular, the present disclosure is understood to relate to apparatus for carrying out the methods described above.

It should further be noted that the description and drawings merely illustrate the principles of the proposed methods and apparatus. Those skilled in the art will be able to implement various arrangements that, although not explicitly described or shown herein, embody the principles of the disclosure and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the disclosure, as well as specific examples thereof, are intended to encompass equivalents thereof.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling transmission of signals in a group of beams emitted by a satellite, wherein each beam has an associated area of coverage, the method comprising:
   adjusting an allocation of a channel resource by re-distributing portions of the channel resource among the beams in the group of beams in accordance with respective capacity demands for the areas of coverage of the beams in the group;
   obtaining, for each of the areas of coverage, an indication of a signal quality from a terminal in the respective area of coverage based on the adjusted allocation of the channel resource; and
   applying a co-channel interference mitigating technique to the group of beams in accordance with the obtained indications of the signal quality.

2. The method according to claim 1, wherein applying the co-channel interference mitigating technique involves performing precoding across the group of beams in accordance with the obtained indications of the signal quality.

3. The method according to claim 1, wherein adjusting the allocation of the channel resource is performed such that after re-distributing the portions of the channel resource, at least one portion of the channel resource is allocated to more than one beam in the group of beams.

4. The method according to claim 1, further comprising:
   determining whether a capacity demand for at least one of the areas of coverage has changed; and
   if it is determined that the capacity demand for the at least one of the areas of coverage has changed, adjusting the allocation of the channel resource.

5. The method according to claim 1,
   wherein the channel resource is sub-divided into a plurality of units of identical size; and
   the method further comprises:
      for each beam in the group of beams, determining, as a first number, a number of units of the channel resource for allocation to the respective beam on the basis of the capacity demand for the area of coverage of the respective beam; and
      for each beam in the group of beams, allocating the respective first number of units of the channel resource to the respective beam.

6. The method according to claim 5,
wherein the satellite comprises one or more further groups of beams; and
the method further comprises, for each beam in the group of beams, determining, as a second number, a number of beams in the one or more further groups of beams that have their respective areas of coverage adjacent to the area of coverage of the respective beam;
wherein said adjusting of the allocation of the channel resource is performed in a beam-wise manner in the order of the associated second numbers of the beams, starting with the beam having the highest second number; and
wherein said adjusting of the allocation of the channel resource involves, for each of the beams in the group of beams, first allocating those units of the channel resource to the respective beam that are not already allocated to any one of the beams in the one or more further groups of beams that have their respective areas of coverage adjacent to the area of coverage of the respective beam.

7. The method according to claim 1, further comprising, for each beam in the group of beams:
determining a difference between the capacity demand and the available capacity provided by the respective beam;
determining a change in transmission power for the respective beam in order to reduce said difference; and
adjusting the transmission power of the respective beam on the basis of the determined change in transmission power.

8. The method according to claim 1,
wherein the satellite comprises one or more further groups of beams; and
the method further comprises:
adjusting a polarization pattern for those beams in the group of beams or the one or more further groups of beams, whose area of coverage is adjacent to an area of coverage belonging to a beam in a different one of the group of beams or the one or more further groups of beams,
wherein said adjusting the polarization pattern is performed such that distances between areas of coverage of beams with the same polarization in different ones of the group of beams and the one or more further groups of beams are maximized.

9. The method according to claim 1, wherein the channel resource is a time frame that includes a plurality of time slots and periodically repeats in time, and adjusting the allocation of the channel resource involves allocating a respective number of time slots per time frame to each of the beams in the group of beams.

10. An apparatus for controlling transmission of signals in a group of beams emitted by a satellite, wherein each beam has an associated area of coverage, the apparatus comprising:
a controller adapted to adjust an allocation of a channel resource by re-distributing portions of the channel resource among the beams in the group of beams in accordance with respective capacity demands for the areas of coverage of the beams in the group; and
a receiver adapted to receive, for each of the areas of coverage, an indication of a signal quality from a terminal in the respective area of coverage based on the adjusted allocation of the channel resource,
wherein the controller is further adapted to apply a co-channel interference mitigating technique to the group of beams in accordance with the indications of the signal quality received by the receiver.

11. The apparatus according to claim 10, wherein the controller is adapted to apply a co-channel interference mitigating technique by performing precoding across the group of beams in accordance with the received indications of the signal quality.

12. The apparatus according to claim 10, wherein the controller is further adapted to:
determine whether a capacity demand for at least one of the areas of coverage has changed; and
if it is determined that the capacity demand for the at least one of the areas of coverage has changed, adjust the allocation of the channel resource.

13. The apparatus according to claim 10,
wherein the channel resource is sub-divided into a plurality of units of identical size; and
the controller is further adapted to:
for each beam in the group of beams, determine, as a first number, a number of units of the channel resource for allocation to the respective beam on the basis of the capacity demand for the area of coverage of the respective beam; and
for each beam in the group of beams, allocate the respective first number of units of the channel resource to the respective beam.

14. The apparatus according to claim 13, wherein:
the satellite comprises one or more further groups of beams; and
the controller is further adapted to:
for each beam in the group of beams, determine, as a second number, a number of beams in the one or more further groups of beams that have their respective areas of coverage adjacent to the area of coverage of the respective beam;
adjust the allocation of the channel resource in a beam-wise manner in the order of the associated second numbers of the beams, starting with the beam having the highest second number; and
for each of the beams in the group of beams, first allocate those units of the channel resource to the respective beam that are not already allocated to any one of the beams in the one or more further groups of beams that have their respective areas of coverage adjacent to the area of coverage of the respective beam.

15. The apparatus according to claim 10, wherein the controller is further adapted to, for each beam in the group of beams:
determine a difference between the capacity demand and the available capacity provided by the respective beam;
determine a change in transmission power for the respective beam in order to reduce said difference; and
adjust the transmission power of the respective beam on the basis of the determined change in transmission power.

16. The method according to claim 1, wherein the channel resource is a frequency band that includes a plurality of frequency sub-bands, and adjusting the allocation of the channel resource involves allocating a respective number of frequency sub-bands of the frequency band to each of the beams in the group of beams.

* * * * *